(12) United States Patent
Kuroume et al.

(10) Patent No.: US 9,126,114 B2
(45) Date of Patent: Sep. 8, 2015

(54) STORAGE MEDIUM, INPUT TERMINAL DEVICE, CONTROL SYSTEM, AND CONTROL METHOD

(75) Inventors: Tomoaki Kuroume, Kyoto (JP); Tetsuya Sasaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 415 days.

(21) Appl. No.: 13/419,697

(22) Filed: Mar. 14, 2012

(65) Prior Publication Data
US 2013/0113698 A1 May 9, 2013

(30) Foreign Application Priority Data
Nov. 9, 2011 (JP) .................. 2011-245095

(51) Int. Cl.
G09G 5/00 (2006.01)
A63F 13/40 (2014.01)
G06F 3/03 (2006.01)

(52) U.S. Cl.
CPC .............. *A63F 13/10* (2013.01); *G06F 3/0308* (2013.01)

(58) Field of Classification Search
None
See application file for complete search history.

(56) References Cited

U.S. PATENT DOCUMENTS

| | | |
|---|---|---|
| 4,312,016 A | 1/1982 | Glaab et al. |
| 5,410,326 A | 4/1995 | Goldstein |
| 5,554,980 A | 9/1996 | Hashimoto et al. |
| 5,872,562 A | 2/1999 | McConnell et al. |
| 5,896,125 A | 4/1999 | Niedzwiecki |
| 8,292,738 B2 | 10/2012 | Hosoi et al. |
| 8,350,830 B2 | 1/2013 | Hosoi et al. |
| 2003/0236617 A1 | 12/2003 | Yamada et al. |
| 2004/0064234 A1 | 4/2004 | Okamoto |
| 2006/0001644 A1 | 1/2006 | Arakawa et al. |
| 2006/0038833 A1 | 2/2006 | Mallinson et al. |
| 2006/0223635 A1 | 10/2006 | Rosenberg |
| 2006/0285843 A1 | 12/2006 | Sakurai |
| 2007/0050139 A1 | 3/2007 | Sidman |
| 2007/0060228 A1 | 3/2007 | Akasaka et al. |
| 2008/0040079 A1 | 2/2008 | Hargreaves |
| 2008/0123582 A1 | 5/2008 | Maekawa |
| 2008/0297487 A1 | 12/2008 | Hotelling et al. |
| 2008/0318692 A1 | 12/2008 | Dohta |
| 2009/0066648 A1 | 3/2009 | Kerr et al. |

(Continued)

FOREIGN PATENT DOCUMENTS

| | | |
|---|---|---|
| JP | 2-198299 | 8/1990 |
| JP | 07-336778 | 12/1995 |

(Continued)

OTHER PUBLICATIONS

Notice of Allowance for U.S. Appl. No. 13/702,427 dated Sep. 11, 2013.

(Continued)

*Primary Examiner* — Joseph Feild
*Assistant Examiner* — Henok Heyi
(74) *Attorney, Agent, or Firm* — Nixon & Vanderhye, P.C.

(57) ABSTRACT

An input terminal device of one example includes a CPU, and the CPU transmits operation data to a game apparatus executing game processing in response to an operation by a user. Furthermore, when a TV remote control button provided to the input terminal device is operated, the CPU sets a TV control mode capable of operating a television, to thereby display a TV remote controller image on an LCD of the input terminal device. By using this image, the user inputs operation data of the television.

24 Claims, 16 Drawing Sheets

(56) References Cited

U.S. PATENT DOCUMENTS

| | | | |
|---|---|---|---|
| 2009/0069096 A1 | 3/2009 | Nishimoto | |
| 2009/0247250 A1 | 10/2009 | Kato et al. | |
| 2009/0278796 A1 | 11/2009 | Komazaki | |
| 2009/0300108 A1 | 12/2009 | Kohno | |
| 2010/0033424 A1 | 2/2010 | Kabasawa et al. | |
| 2010/0245605 A1 | 9/2010 | Sakurai | |
| 2010/0248825 A1 | 9/2010 | Toyoda | |
| 2010/0248835 A1 | 9/2010 | Suzuki et al. | |
| 2011/0074591 A1* | 3/2011 | Arling et al. | 340/635 |
| 2011/0124414 A1* | 5/2011 | Sawano et al. | 463/39 |
| 2011/0190052 A1 | 8/2011 | Takeda et al. | |
| 2011/0190061 A1 | 8/2011 | Takeda et al. | |
| 2011/0244937 A1 | 10/2011 | Yamashita et al. | |
| 2011/0285704 A1 | 11/2011 | Takeda et al. | |
| 2012/0044177 A1 | 2/2012 | Ohta et al. | |
| 2012/0046106 A1 | 2/2012 | Ito et al. | |
| 2012/0086630 A1 | 4/2012 | Zhu et al. | |
| 2012/0086631 A1 | 4/2012 | Osman et al. | |
| 2012/0144299 A1* | 6/2012 | Patel et al. | 715/702 |
| 2012/0242526 A1* | 9/2012 | Perez et al. | 341/176 |
| 2012/0256835 A1* | 10/2012 | Musick et al. | 345/161 |
| 2012/0280932 A1 | 11/2012 | Krah et al. | |
| 2012/0313976 A1* | 12/2012 | Shirakawa | 345/676 |
| 2013/0101140 A1* | 4/2013 | Cho et al. | 381/109 |
| 2013/0314340 A1 | 11/2013 | Shimohata et al. | |
| 2014/0078053 A1 | 3/2014 | Shimohata et al. | |

FOREIGN PATENT DOCUMENTS

| | | |
|---|---|---|
| JP | 2009-009371 | 1/1997 |
| JP | 09-182177 | 7/1997 |
| JP | 10-290488 | 10/1998 |
| JP | 2002-268691 | 9/2002 |
| JP | 2004-283485 | 10/2004 |
| JP | 2006-098011 | 4/2006 |
| JP | 2007-061489 | 3/2007 |
| JP | 2007-306366 | 11/2007 |
| JP | 2007-311868 | 11/2007 |
| JP | 2008-104505 | 5/2008 |
| JP | 2009-141602 | 6/2009 |
| JP | 2009-152836 | 7/2009 |
| JP | 2009-289182 | 12/2009 |
| JP | 2010-147726 | 7/2010 |
| JP | 2011-053060 | 3/2011 |
| JP | 2012-096005 | 5/2012 |

OTHER PUBLICATIONS

Quayle Action issued in U.S. Appl. No. 13/702,427 dated May 30, 2013.
Notice of Allowance issued in U.S. Appl. No. 13/702,430 dated Mar. 10, 2014.
Office Action issued in U.S. Appl. No. 13/702,430 dated Nov. 25, 2013.
Office Action issued in U.S. Appl. No. 13/702,465 dated Aug. 23, 2013.
Japanese International Search Report issued in Application No. PCT/JP2012/063494 dated Aug. 14, 2012.
International Search Report issued in Application No. PCT/JP2012/063495 dated Aug. 7, 2012.
Office Action issued in U.S. Appl. No. 13/702,465 dated Jan. 16, 2014.
Advisory Action issued in U.S. Appl. No. 13/702,465 dated May 7, 2014.
Lawler, R., "Google TV Remote App Now Available for iPhone, iPad, iPod Touch," http://www.engadget.com/2011/03/18/google-tv-remote-app-now-available-for-iphone-ipad-ipod-touch/; Mar. 18, 2011 (14 pages).
"Google TV Remote on the App Store on iTunes," https://itunes.apple.com/us/app/google-tv-remote/id422137859?mt=8; Mar. 16, 2011 (4 pages).
Patel, N., "Google TV Review," http://www.engadget.com/2010/10/29/google-tv-review/; Oct. 29, 2010 (38 pages).

* cited by examiner (A) GAME IMAGE FOR TELEVISION 200

(B) GAME IMAGE FOR TERMINAL 250

(A) WHEN POWER OF GAME APPARATUS IS TURNED ON (B) WHEN POWER OF GAME APPARATUS IS TURNED OFF

STORAGE MEDIUM, INPUT TERMINAL DEVICE, CONTROL SYSTEM, AND CONTROL METHOD

CROSS REFERENCE OF RELATED APPLICATION

The disclosure of Japanese Patent Application No. 2011-245095 filed on Nov. 9, 2011 is incorporated herein by reference.

FIELD

The present embodiment relates to a storage medium, an input terminal device, a control system and a control method. More specifically, the present invention relates to a storage medium, input terminal device, control system and control method that makes an input to an information processing apparatus executing an application.

SUMMARY

It is a primary object of the present embodiment to provide a novel storage medium, input terminal device, control system and control method.

Another object of the present embodiment is to provide a storage medium, an input terminal device, a control system and a control method capable of remotely controlling another appliance without suspending information processing of an information processing apparatus.

A first embodiment is a storage medium storing a control program of an input terminal device associated with an information processing apparatus executing an application based on an input from the input terminal device, the control program causes a computer of the input terminal device to function as an input determiner, and a mode setter. The input determiner determines whether or not a predetermined input is present. The mode setter switches between an application mode capable of inputting to the information processing apparatus executing the application and an appliance control mode capable of controlling an appliance to be controlled different from at least the information processing apparatus when the input determiner determines that the predetermined input is present. That is, the mode setter switches to the appliance control mode, if there is a predetermined input when the application mode is set, and controversially switches to the application mode if there is a predetermined input when the appliance control mode is set.

According to the first embodiment, when a predetermined input is present, the application mode capable of inputting to the information processing apparatus executing an application and the appliance control mode capable of controlling an appliance to be controlled different from the information processing apparatus are switched, and therefore, it is possible to use the input terminal device also as a control device of the appliance to be controlled. Thus, for example, even during execution of the information processing in the information processing apparatus, another appliance can remotely be controlled without suspending the information processing.

A second embodiment is according to the first embodiment, and the input terminal device further comprises an operator which inputs operation information. The control program causes the computer to further function as an application operation data generator, an application operation data transmitter, an appliance operation data generator, and an appliance operation data transmitter. The application operation data generator generates application operation data corresponding to the operation information at a time of the application mode. The application operation data transmitter transmits the application operation data to the information processing apparatus. For example, in response thereto, the information processing apparatus executes processing of the application on the basis of the application operation data.

The appliance operation data generator generates appliance operation data corresponding to the appliance to be controlled on the basis of the operation information at a time of the appliance control mode. The appliance operation data transmitter transmits the appliance operation data to the appliance to be controlled. For example, in response thereto, the appliance to be controlled executes processing based on the appliance operation data.

According to the second embodiment, by using only the input terminal device, it is possible to control the information processing apparatus and the appliance to be controlled.

A third embodiment is according to the second embodiment, and the control program causes the computer to further function as dummy operation data generator and a dummy operation data transmitter. The dummy operation data generator generates predetermined dummy operation data in response to the application operation data not based on the operation information when the mode setter sets the appliance control mode. The dummy operation data transmitter transmits the dummy operation data to the information processing apparatus.

According to the third embodiment, in a case that the appliance control mode is set, the dummy operation data based not on the operation information is generated, and transmitted to the information processing apparatus, and therefore, no change is made on the processing in the information processing apparatus. Furthermore, since the operation data is dummy, it has no influence on the processing of the application of the information processing apparatus.

A fourth embodiment is according to the second embodiment, and the application operation data generated by the application operation data generator and the appliance operation data generated by the appliance operation data generator are different in format.

According to the fourth embodiment, the first operation data and the second operation data are different in format, and thus, the information processing apparatus and the appliance to be controlled are never controlled by mistake.

A fifth embodiment is according to the second embodiment, and the application operation data transmitter transmits the application operation data to the information processing apparatus by using a first transmitter. Furthermore, the appliance operation data transmitter transmits the appliance operation data to the appliance to be controlled by using a second transmitter being different from the first transmitter.

According to the fifth embodiment, the application operation data and the appliance operation data are transmitted by using a different transmitter, and therefore, similar to the fourth embodiment, the information processing apparatus and the appliance to be controlled are never controlled by mistake.

A sixth embodiment is according to the second embodiment, and the control program causes the computer to further function as an appliance selector. The appliance selector selects a kind of the appliance to be controlled according to an operation by the user, for example. The appliance operation data generator generates the appliance operation data depending on the kind of the appliance to be controlled selected by the appliance selector.

According to the sixth embodiment, it is possible to generate the appropriate operation data depending on the kind of the appliance to be controlled.

A seventh embodiment is according to the first embodiment, and the input terminal device includes a predetermined inputter which allows for the predetermined input. The input determiner determines that the predetermined input is present in response to the predetermined inputter being operated. The mode setter sets the appliance control mode when the input determiner determines that the predetermined input is present, and ends the appliance control mode when it is determined that the predetermined input is present at a time of the appliance control mode being set.

According to the seventh embodiment, the predetermined inputter for setting and ending the appliance control mode is provided, which allows for an easy operation.

An eighth embodiment is according to the first embodiment, and the control program causes the computer to further function as a received image displayer and an operation image displayer. The received image displayer receives image data from the information processing apparatus, and displays an image corresponding to the image data on a displayer. The operation image displayer displays an operation image of the appliance to be controlled at a front of the image displayed on the displayer when the mode setter sets the appliance control mode.

According to the eighth embodiment, the operation image of the appliance to be controlled is displayed at the front of the image corresponding to the image data received from the information processing apparatus, and therefore, it is easily operate (control) the appliance to be controlled.

A ninth embodiment is according to the first embodiment, and the control program causes the computer to further function as a sound outputter. The sound outputter receives audio data from the information processing apparatus, and outputs a sound corresponding to the audio data from a speaker. When the mode setter sets the appliance control mode, the sound outputter lowers a volume of the sound corresponding to the audio data from the information processing apparatus.

According to the ninth embodiment, when the appliance control mode is set, the volume of the sound corresponding to the audio data from the information processing apparatus is lowered, and therefore, for example, in a case that an operation sound is output when the appliance to be controlled is operated, it is easy to hear the operation sound.

A tenth embodiment is according to the first embodiment, and the application includes a game application.

According to the tenth embodiment, a game operation in the information processing apparatus and an operation in the appliance to be controlled are made possible.

An eleventh embodiment is according to the first embodiment, and the input terminal device further comprises a power-supply operator which inputs power-supply control information for controlling power of the information processing apparatus. The control program causes the computer to further function as a power-supply control data generator and a power-supply control data transmitter. The power-supply control data generator generates power control data as to the power-supply control information irrespective of the appliance control mode being set when the power-supply operator inputs the power-supply control information. The power-supply control data transmitter transmits the power control data generated by the power-supply control data generator to the information processing apparatus.

According to the eleventh embodiment, irrespective of whether the appliance control mode is set, it is possible to control the power supply of the information processing apparatus.

A twelfth embodiment is a storage medium storing a control program of an input terminal device making an input to an information processing apparatus executing an application, and the input terminal device comprises a dedicated button which sets an appliance control mode for controlling an appliance to be controlled being different from the information processing apparatus, and the control program causes the computer of the input terminal device to function as an input determiner which determines whether or not the dedicated button is operated; and a mode setter which sets the appliance control mode irrespective of whether or not the information processing apparatus is activated when the input determiner determines that the dedicated button is operated.

The twelfth embodiment has an advantage similar to the first embodiment and the dedicated button for setting the appliance control mode, and therefore, which allows for an easy operation.

A thirteenth embodiment is an input terminal device making an input to an information processing apparatus executing an application, comprising an input determiner which determines whether or not a predetermined input is present; and a mode setter which switches between an application mode capable of inputting to the information processing apparatus executing the application and an appliance control mode capable of controlling an appliance to be controlled different from at least the information processing apparatus when the input determiner determines that the predetermined input is present.

In the thirteenth embodiment as well, similar to the first embodiment, it is possible to remotely control another appliance without suspending the information processing.

A fourteenth embodiment is an input terminal device making an input to an information processing apparatus executing an application, comprising a dedicated button which sets an appliance control mode for controlling an appliance to be controlled being different from the information processing apparatus; an input determiner which determines whether or not the dedicated button is operated; and a mode setter which sets the appliance control mode irrespective of whether or not the information processing apparatus is activated when the input determiner determines that the dedicated button is operated.

The fourteenth embodiment also has an advantage similar to the first embodiment and has the dedicated button for setting the appliance control mode similar to the twelfth embodiment, which allows for an easy operation.

A fifteenth embodiment is a control system making an input to an information processing apparatus executing an application, comprising: an input determiner which determines whether or not a predetermined input is present; and a mode setter which switches between an application mode capable of inputting to the information processing apparatus executing the application and an appliance control mode capable of controlling an appliance to be controlled different from at least the information processing apparatus when the input determiner determines that the predetermined input is present.

In the fifteenth embodiment as well, similar to the first embodiment, it is possible to remotely control another appliance without suspending the information processing.

A sixteenth embodiment is a control system making an input to an information processing apparatus executing an application, comprising: a dedicated button which sets an appliance control mode for controlling an appliance to be controlled being different from the information processing apparatus; an input determiner which determines whether or not the dedicated button is operated; and a mode setter which sets the appliance control mode irrespective of whether or not the information processing apparatus is activated when the input determiner determines that the dedicated button is operated.

The sixteenth embodiment also has an advantage similar to the first embodiment and has the dedicated button for setting the appliance control mode similar to the twelfth embodiment, which allows for an easy operation.

A seventeenth embodiment is a control method of an input terminal device making an input to an information processing apparatus executing an application, a computer of the input terminal device comprising: (a) determining whether or not a predetermined input is present; and (b) switching between an application mode capable of inputting to the information processing apparatus executing the application and an appliance control mode capable of controlling an appliance to be controlled different from at least the information processing apparatus when the step (a) determines that the predetermined input is present.

In the seventeenth embodiment as well, similar to the first embodiment, it is possible to remotely control another appliance without suspending the information processing.

An eighteenth embodiment is a control method of an input terminal device making an input to an information processing apparatus executing an application, wherein the input terminal device comprises a dedicated button which sets an appliance control mode for controlling an appliance to be controlled being different from the information processing apparatus, and a computer of the input terminal device comprising: (a) determining whether or not the dedicated button is operated; and (b) setting the appliance control mode irrespective of whether or not the information processing apparatus is activated when the step (a) determines that the dedicated button is operated.

The eighteenth embodiment also has an advantage similar to the first embodiment and has the dedicated button for setting the appliance control mode similar to the twelfth embodiment, which allows for easy operation.

The above described objects and other objects, features, aspects and advantages of the present embodiment will become more apparent from the following detailed description of the present embodiment when taken in conjunction with the accompanying drawings.

DETAILED DESCRIPTION OF NON-LIMITING EXAMPLE EMBODIMENTS

Figure 1:
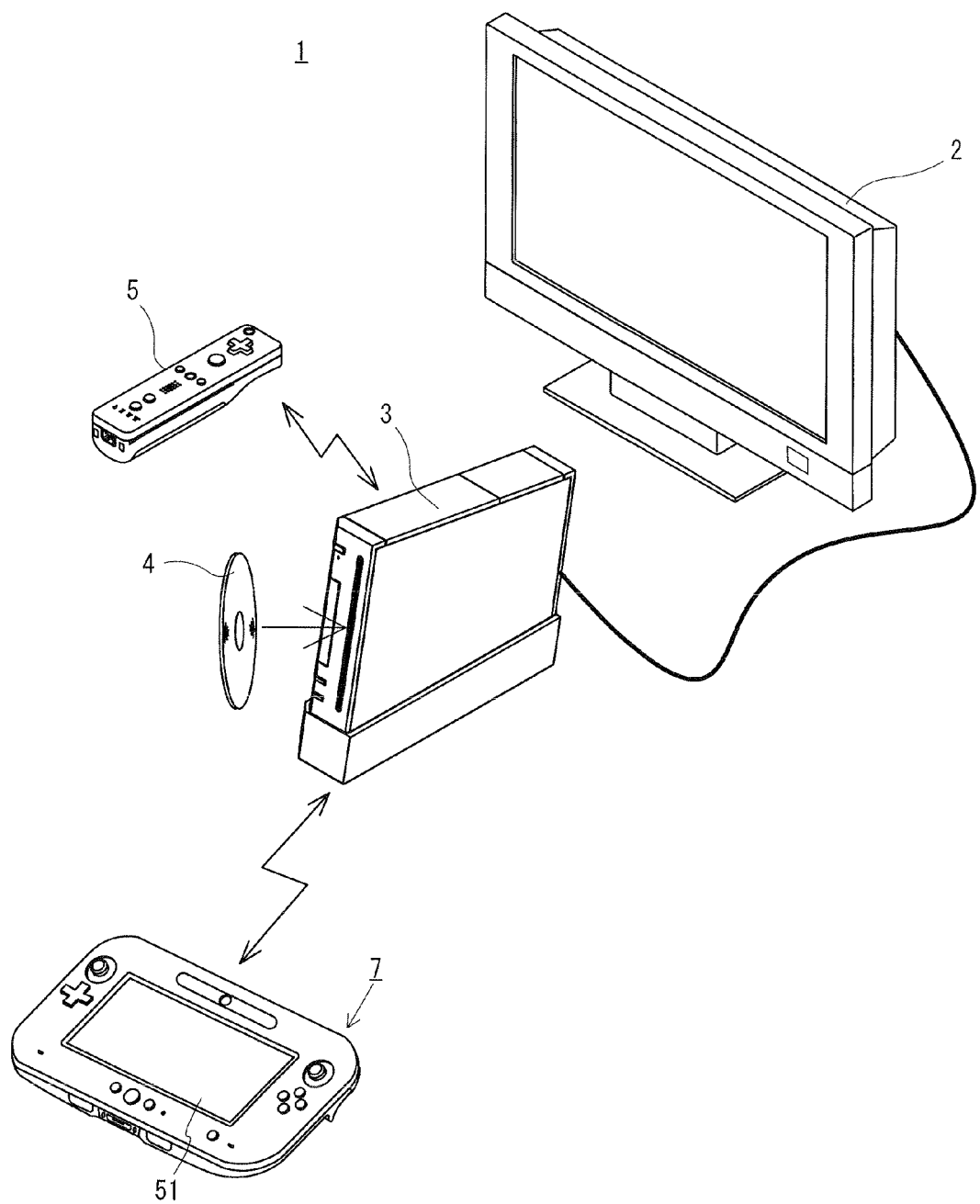
FIG. 1 shows an example non-limiting game system.

One embodiment of a game system 1 is described with reference to drawings below. The game system 1 shown in FIG. 1 includes a console type display device (hereinafter, referred to as "television") 2 typified by a television receiver, or the like, a console type game apparatus 3, an optical disk 4, a controller 5, and an input terminal device 7. The game system 1 is for executing game processing in the game apparatus 3 based on game operations by using the input terminal device 7, and displaying game images obtained by the game processing on the television 2 and/or the input terminal device 7.

It should be noted that in the game system 1, the game processing may be executed in the game apparatus 3 based on game operations using the controller 5, with the input terminal device 7 or without using the input terminal device 7 under certain circumstances.

Into the game apparatus 3, the optical disk 4 being one example of an information storage medium that is used to be replaceable with respect to the game apparatus 3 is loaded. In the optical disk 4, an information processing program (typically, application program such as a game program) to be executed in the game apparatus 3 is stored. The game apparatus 3 executes game processing by reading and executing the information processing program stored in the optical disk 4 loaded into a loading slot provided on a front surface.

To the game apparatus 3, the television 2 is connected via a connection cord. The television 2 displays a game image obtained through the game processing executed by the game apparatus 3. The television 2 has a speaker 2a (FIG. 2), and the speaker 2a outputs game sounds obtained as a result of the game processing described above.

Here, in another embodiment, the game apparatus 3 and the console type display are integrally formed with each other. Furthermore, communications between the game apparatus 3 and the television 2 may be performed wirelessly.

In addition, the controller 5 and the game apparatus 3 can communicate with each other by wireless communications using a technique of Bluetooth (registered trademark), for example. Here, the controller 5 and the game apparatus 3 may be connected by a wire.

The input terminal device 7 transmits and receives data with at least the game apparatus 3. The user (player) can use the input terminal device 7 by moving and holding it with his or her hands, and placing the input terminal device 7 at an arbitrary position. Although a detailed description is made later, the input terminal device 7 has an LCD 51 as a displaying means and an inputting means (touch panel 52, gyro sensor 84, or the like described later). The input terminal device 7 and the game apparatus 3 can communicate with each other wirelessly (by the wire). The input terminal device 7 receives from the game apparatus 3 data of an image (game image, for example) generated in the game apparatus 3, and displays the image on the LCD 51. Furthermore, the input terminal device 7 transmits to the game apparatus 3 operation data indicating a content of the operation performed on the user's own apparatus.

It should be noted that in this embodiment, an LCD is employed as a display, but the input terminal device 7 may include another arbitrary display, such as a display using EL (Electro Luminescence), for example.

Additionally, in FIG. 1, the number of input terminal devices 7 included in the game system 1 is one, but the game apparatus 3 can communicate with a plurality of input terminal devices 7, and a predetermined number of input terminal devices 7 are simultaneously used to allow a plurality of number of players to play a game.

Figure 2:
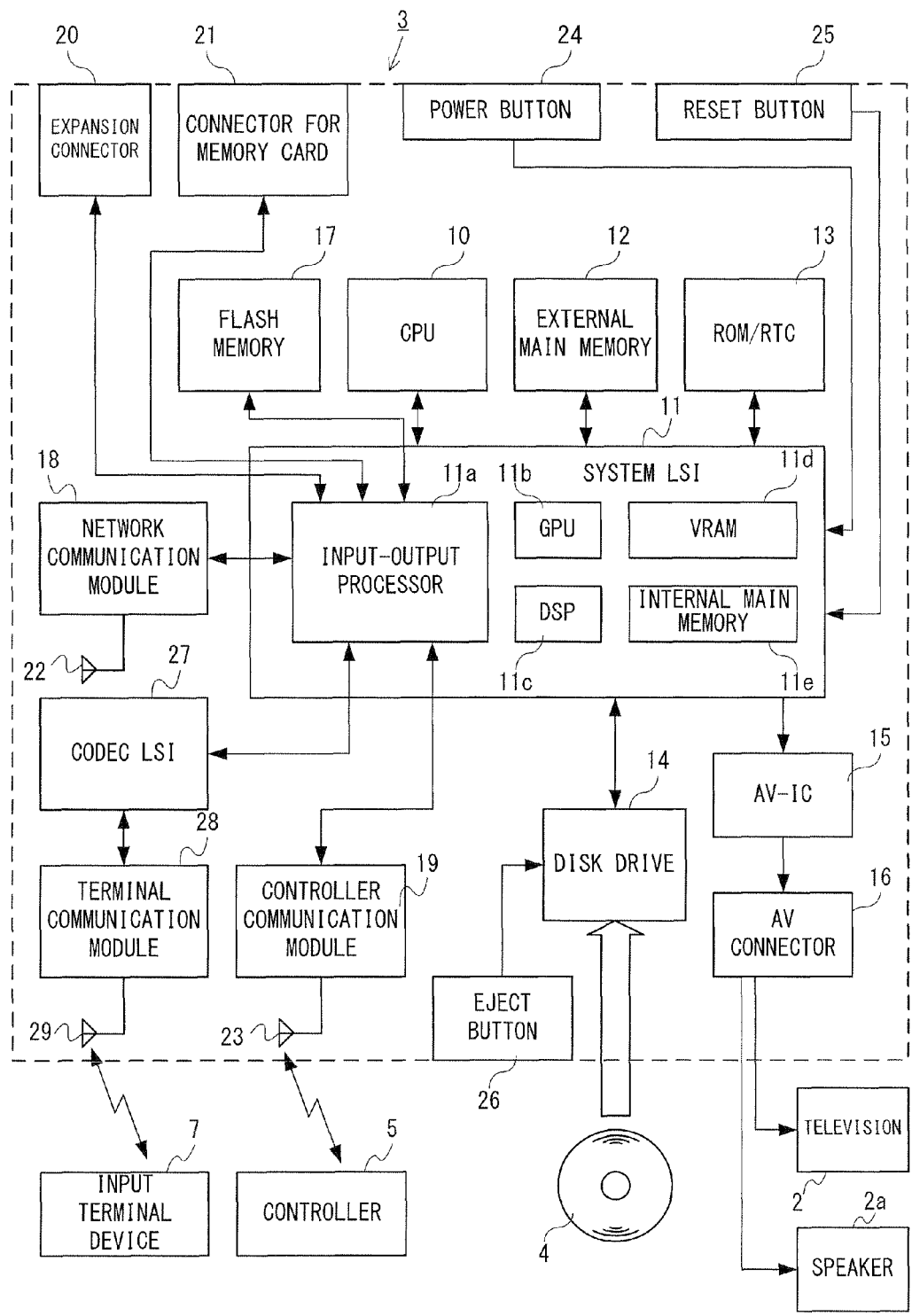
FIG. 2 is a block diagram showing an example non-limiting electric configuration of a game apparatus.

FIG. 2 is a block diagram showing an example non-limiting electric configuration of a game apparatus 3. The game apparatus 3 has a CPU 10, a system LSI 11, an external main memory 12, a ROM/RTC 13, a disk drive 14, an AV-IC 15, etc.

The CPU 10 is for executing game processing by executing the game program stored in the optical disk 4, and functions as a game processor. The CPU 10 is connected to the system LSI 11. The system LSI 11 is connected with the external main memory 12, the ROM/RTC 13, the disk drive 14 and the AV-IC 15 other than the CPU 10. The system LSI 11 performs processing of controlling data transfer between the respective components connected thereto, generating images to be displayed, acquiring data from external devices, etc.

The external main memory 12 being volatile is for storing programs such as a game program read from the optical disk 4, a game program, etc. read from the flash memory 17, storing various data, and is utilized as a work area and a buffer area of the CPU 10. The ROM/RTC 13 has a ROM (so called a boot ROM) including a program for activating the game apparatus 3 and a clock circuit (RTC) for counting a time. The disk drive 14 reads program data, texture data, etc. from the optical disk 4, and writes the read data to an internal main memory lie or the external main memory 12 described later.

The system LSI 11 is provided with an input-output processor (I/O processor) 11a, a GPU 11b, a DSP 11c, a VRAM 11d, and the internal main memory 11e. Although illustration is omitted, these components 11a-11e are connected with each other by internal buses.

The GPU 11b is constructed of a part of a depicting means, and generates image data according to a graphics command from the CPU 10. Here, data such as polygon data, texture data, etc. is stored in the VRAM 11d, and the GPU 11b generates image data by using the data. In this embodiment, the game apparatus 3 generates both of a game image to be displayed on the television 2 and a game image to be displayed on the input terminal device 7. Hereinafter, the game image displayed on the television 2 may be called a "game image for television", and the game image displayed on the input terminal device 7 may be called a "game image for terminal".

The DSP 11c functions as an audio processor, and generates audio data by using sound data and sound waveform (tone) data stored in the internal main memory 11e and the external main memory 12. In this embodiment, with respect to the game sound, both of a game sound to be output from the speaker of the television 2 and a game sound to be output from the speaker of the input terminal device 7 are generated similar to the game image. Hereinafter, the game sound output from the television 2 may be called a "game sound for television", and the game sound output from the input terminal device 7 may be called a "game sound for terminal".

As described above, data of images and sounds (including sound effect, music, etc. This holds true below.) to be output to the television 2 out of the images and sounds generated in the game apparatus 3 are read by the AV-IC 15. The AV-IC 15 outputs the read image data to the television 2 via the AV connector 16, and outputs the read audio data to the speaker 2a integrated in the television 2. Thus, an image is displayed on the television 2 while a sound is output from the speaker 2a.

Also, data of images and sounds to be output by the input terminal device 7 out of the images and sounds generated in the game apparatus 3 are transmitted to the input terminal device 7 by the input-output processor 11a or the like. The data transmission to the input terminal device 7 by the input-output processor 11a or the like is described later.

Here, sound data to be output by the controller 5 out of the sounds generated in the game apparatus 3 is transmitted to the controller 5 by the input-output processor 11a or the like.

The input-output processor 11a executes data transmission and reception with the components connected thereto, and executes downloading data from external devices. Also, the input-output processor 11a is connected with the flash memory 17, a network communication module 18, a controller communication module 19, an expansion connector 20, a connector for memory card 21, and a codec LSI 27. Furthermore, the network communication module 18 is connected with an antenna 22. The controller communication module 19 is connected with an antenna 23. The codec LSI 27 is connected to a terminal communication module 28, and the terminal communication module 28 is connected with an antenna 29.

The input-output processor 11a can connect to networks like the Internet, etc. via the network communication module 18 and the antenna 22, and communicate with external information processing apparatuses (other game apparatuses, various servers, for example) connected to the network.

The input-output processor 11a periodically accesses the flash memory 17 to detect the presence or absence of data required to be transmitted to the network, and if the data is present, transmits it to the network via the network communication module 18 and the antenna 22.

Also, the input-output processor 11a receives data transmitted from external information processing apparatuses and data downloaded from a download server via the network, the antenna 22 and the network communication module 18, and stores the received data in the flash memory 17.

The CPU 10 executes the game program to thereby read the data stored in the flash memory 17 so as to use it in the game program. In the flash memory 17, other than the data to be transmitted and received between the game apparatus 3 and the external information processing apparatuses, save data (result data or proceeding data of the game) of the game played by using the game apparatus 3 may be stored. Also, in the flash memory 17, the game program may be stored.

Furthermore, the game apparatus 3 can receive operation data from the controller 5, and can transmit control data and note data to the controller 5 as required. That is, the input-output processor 11a receives the operation data transmitted from the controller 5 via the antenna 23 and the controller communication module 19, and stores (temporarily stores) the same in a buffer area of the internal main memory 11e or the external main memory 12. Meanwhile, the input-output processor 11a outputs control data according to an instruction from the CPU 10 and audio data generated by the DSP 11c to the controller communication module 19, and the controller communication module 19 transmits the control data and the audio data to the controller 5 via the antenna 23.

Also, the game apparatus 3 can transmit and receive data of images, sounds, etc. to and from the input terminal device 7. The input-output processor 11a outputs the data of the game image generated by the GPU 11b to the codec LSI 27 if transmitting the game image (game image for terminal) to the input terminal device 7. The codec LSI 27 performs predetermined compression processing on the image data from the input-output processor 11a. The terminal communication module 28 communicates with the input terminal device 7 wirelessly. Accordingly, the image data compressed by the codec LSI 27 is transmitted to the input terminal device 7 via the antenna 29 by the terminal communication module 28. In this embodiment, the codec LSI 27 compresses the image data by using efficient compression technique, such as H.264 standard, for example.

It should be noted that a compression technique except for it may be used, and the image data may be adapted to be transmitted without being compressed if the communication speed is enough high.

Furthermore, the terminal communication module 28 is a communication module that obtains Wi-Fi certification, for example, and may use a MIMO (Multiple Input Multiple Output) technique employed in IEEE802.11n standard, for example, to thereby make high speed wireless communications with the input terminal device 7, or may use other communication systems.

In addition, the game apparatus 3 transmits audio data to the input terminal device 7 besides the image data. That is, the input-output processor 11a outputs the audio data generated by the DSP 11c to the terminal communication module 28 via the codec LSI 27. The codec LSI 27 also performs the compression processing on the audio data similar to the image data. The compression format of the audio data may be of any format. In another embodiment, the audio data may be transmitted without being compressed. The terminal communication module 28 transmits the compressed image data and audio data to the input terminal device 7 via the antenna 29.

In addition, the game apparatus 3 transmits various control data to the input terminal device 7 besides the aforementioned image data and audio data. The control data is data indicating a controlling instruction on the components contained in the input terminal device 7, and indicates an instruction of controlling imaging by the camera (camera 56 shown in FIG. 3), for example. The input-output processor 11a transmits the control data to the input terminal device 7 in response to an instruction from the CPU 10.

Here, in this embodiment, the codec LSI 27 does not perform the compression processing on this control data, but may perform the compression processing in another embodiment. Moreover, the above-described data transmitted from the game apparatus 3 to the input terminal device 7 may be encoded as required or not may be encoded.

Additionally, the game apparatus 3 can receive various data from the input terminal device 7. Although the detail is described later, in this embodiment, the input terminal device 7 transmits operation data, image data, and audio data. Each data transmitted from the input terminal device 7 is received by the terminal communication module 28 via the antenna 29. Here, the image data and the audio data from the input terminal device 7 undergoes compression processing similar to the image data and the audio data from the game apparatus 3 to the input terminal device 7.

Accordingly, the image data and the audio data are transmitted from the terminal communication module 28 to the codec LSI 27, then undergoes expansion processing by the codec LSI 27, and output to the input-output processor 11a.

On the other hand, the operation data from the input terminal device 7, which has less data than images and sounds, may not be required to undergo the compression processing. Also, it may be encoded as required or may not be encoded. Accordingly, the operation data is received in the terminal communication module 28, and then output to the input-output processor 11a via the codec LSI 27. The input-output processor 11a stores (temporarily stores) the data received from the input terminal device 7 in the buffer area of the internal main memory 11e or the external main memory 12.

Furthermore, the game apparatus 3 can connect to another appliance and an external storage. That is, the input-output processor 11a is connected with the expansion connector 20 and the connector for memory card 21. The expansion connector 20 is a connector for interfaces such as USB, SCSI. The expansion connector 20 can be connected with storage medium such as an external storage and connected with peripheral devices of other controllers, etc., and can make communication with networks in place of the network communication module 18 by being connected with a wired connector for communication.

The connector for memory card 21 is a connector for being connected with an external storage such as a memory card. For example, the input-output processor 11a can access the external storage via the expansion connector 20 and the connector for memory card 21, and can store data in the external storage and read data from the external storage.

The game apparatus 3 is provided with a power button 24, a reset button 25, and an eject button 26. The power button 24 and the reset button 25 are connected to the system LSI 11. When the power button 24 is turned on, electric power is supplied to the respective components of the game apparatus 3 from an external power source by an AC adapter not shown. When the reset button 25 is pushed, the system LSI 11 restarts an activation program of the game apparatus 3. The eject button 26 is connected to the disk drive 14. When the eject button 26 is pushed, the optical disk 4 is ejected from the disk drive 14.

It should be noted that in another embodiment, some components contained in the game apparatus 3 may be configured as an expansion unit separately from the game apparatus 3. At this time, the expansion unit may be connected to the game apparatus 3 via the aforementioned expansion connector 20, for example.

Figure 3:
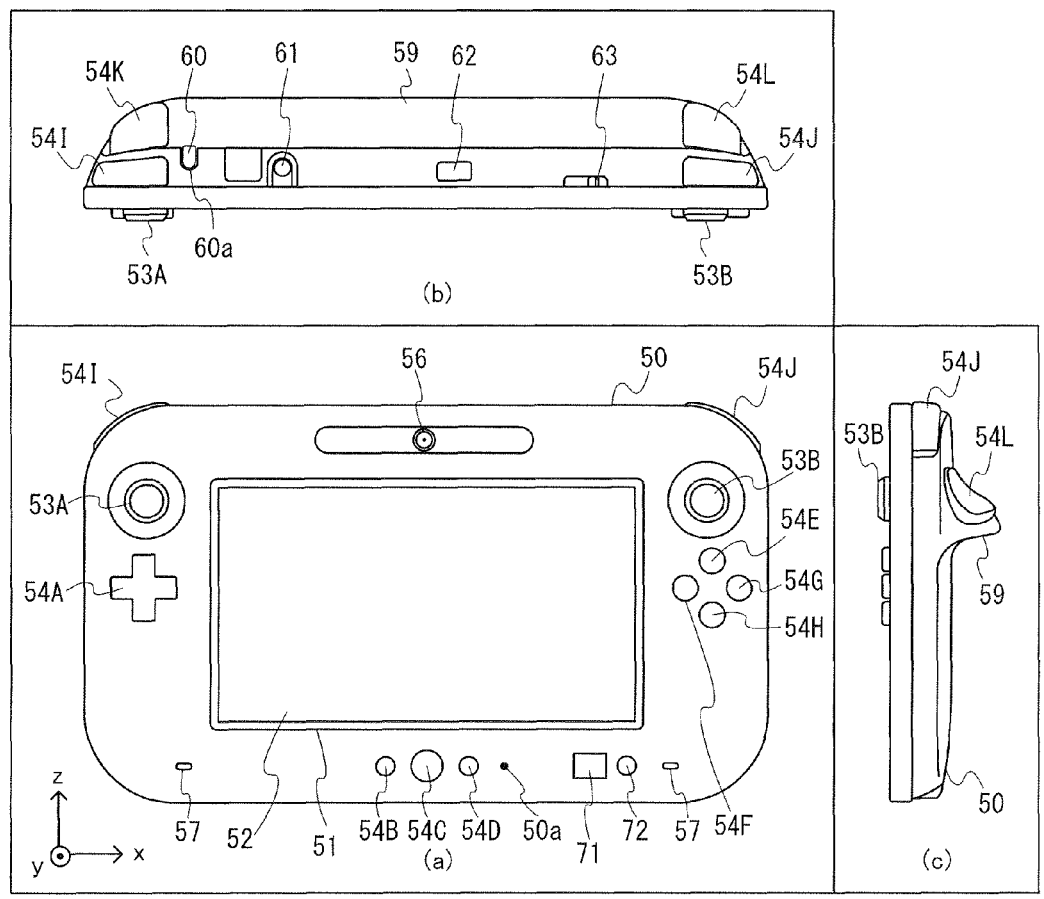
FIG. 3 shows an example non-limiting external configuration of an input terminal device.

Next, referring to FIG. 3, the configuration of the input terminal device 7 is described. FIG. 3 is a plan view showing an external appearance of the input terminal device 7. FIG. 3(a) is a front view of the input terminal device 7, FIG. 3(b) is a top view thereof, and FIG. 3(c) is a right side view thereof.

As shown in FIG. 3(a), the input terminal device 7 has a housing 50 in the form of a roughly transversely elongated rectangular plate. The housing 50 is constructed such a size that a user can hold with his or her both hands or one hand.

Accordingly, the user can move the input terminal device 7 holding with his or her hands, and can change the placed position of the input terminal device 7.

The input terminal device 7 has an LCD 51 around the center on a top surface (upper side) of the housing 50. Thus, although the illustration is omitted, by holding the housing 50 on both sides of the LCD 51, the user can move the input terminal device 7 while viewing the screen of the LCD 51. Here, the input terminal device 7 can be used laterally (is held with the width greater than the length), and can be used longitudinally (with the length greater than the width).

As shown in FIG. 3(a), the input terminal device 7 has a touch panel 52 on the screen of the LCD 51 as an operating means. For example, as a touch panel 52, arbitrary systems such as a resistive system, electrostatic capacitive system, etc. can be employed. Also, the touch panel 52 may be single touch systems and multi-touch systems.

Thus, the input terminal device 7 is provided with the touch panel 52, and therefore, the user can operate the touch panel 52 while moving the input terminal device 7. That is, the user can perform a direct input to the screen (input by the touch panel 52) while moving the screen of the LCD 51.

As shown in FIG. 3(a), the input terminal device 7 has two analog sticks 53A and 53B and a plurality of buttons (keys) 54A-54L, 71 and 72 as input means (operating portion) for performing a predetermined input. Each of the analog sticks 53A and 53B is a device capable of designating a direction. Each analog stick 53A and 53B is adapted such that a movable member (stick portion) to be operated by a finger of the user can slide with respect to the upper side of the housing 50 in an arbitrary direction (left, right, top, bottom and oblique directions at any angles). That is, this is a direction input device that may be called a slide pad.

Here, the movable member of each analog stick 53A and 53B may be of the type tilted with respect to the upper surface of the housing 50 at an arbitrary direction.

Although illustration is omitted, the respective buttons 54A-54L are provided in such positions that the user can operate them while holding both sides of the input terminal device 7 (holding it laterally). Thus, the user can easily operate the operating means even when he or she moves the input terminal device 7 while holding it.

As shown in FIG. 3(a), on the upper side of the housing 50, out of the respective operation buttons 54A-54L, the cross button (direction input button) 54A, the buttons 54B-54H, the television remote control button (hereinafter, referred to as "TV remote control button".) 71 and the power button 72 are provided.

The TV remote control button 71 is a button for setting a mode of making the input terminal device 7 function as a remote controller for operating (controlling) the television 2 (television control mode), and ending the television control mode. The power button 72 is a button for turning ON and OFF the power of the game apparatus 3. By operating the power button 72, the power of the game apparatus 3 can remotely be turned ON and OFF. Furthermore, as shown in FIG. 3(b), on the upper side of the housing 50, out of the respective operation buttons 54A-54L, the first L button 541 and the second R button 54J are provided.

Also, as shown in FIG. 3(b) and FIG. 3(c), on the underside of the housing 50, on a top surface of a visor portion 59, the second L button 54K and the second R button 54L are provided.

Moreover, as shown in FIG. 3(a), on the top side of the housing 50, a microphone hole 50a, a camera 56 and two speaker holes 57 are provided. In addition, as shown in FIG. 3(b), on the upper side of the housing 50, a hole 60a into which a touch pen 60 is inserted, a sound output terminal (earphone jack) 61 for being connected to sound outputting means such as earphones, a window 62 thorough which infrared ray signal from an infrared rays module 92 and an infrared rays LED 101 that are described later is output to the outside of the input terminal device 7, and a knob 63 with which the volume of the sound output from a speaker 87 described later is adjusted are provided.

Figure 4:
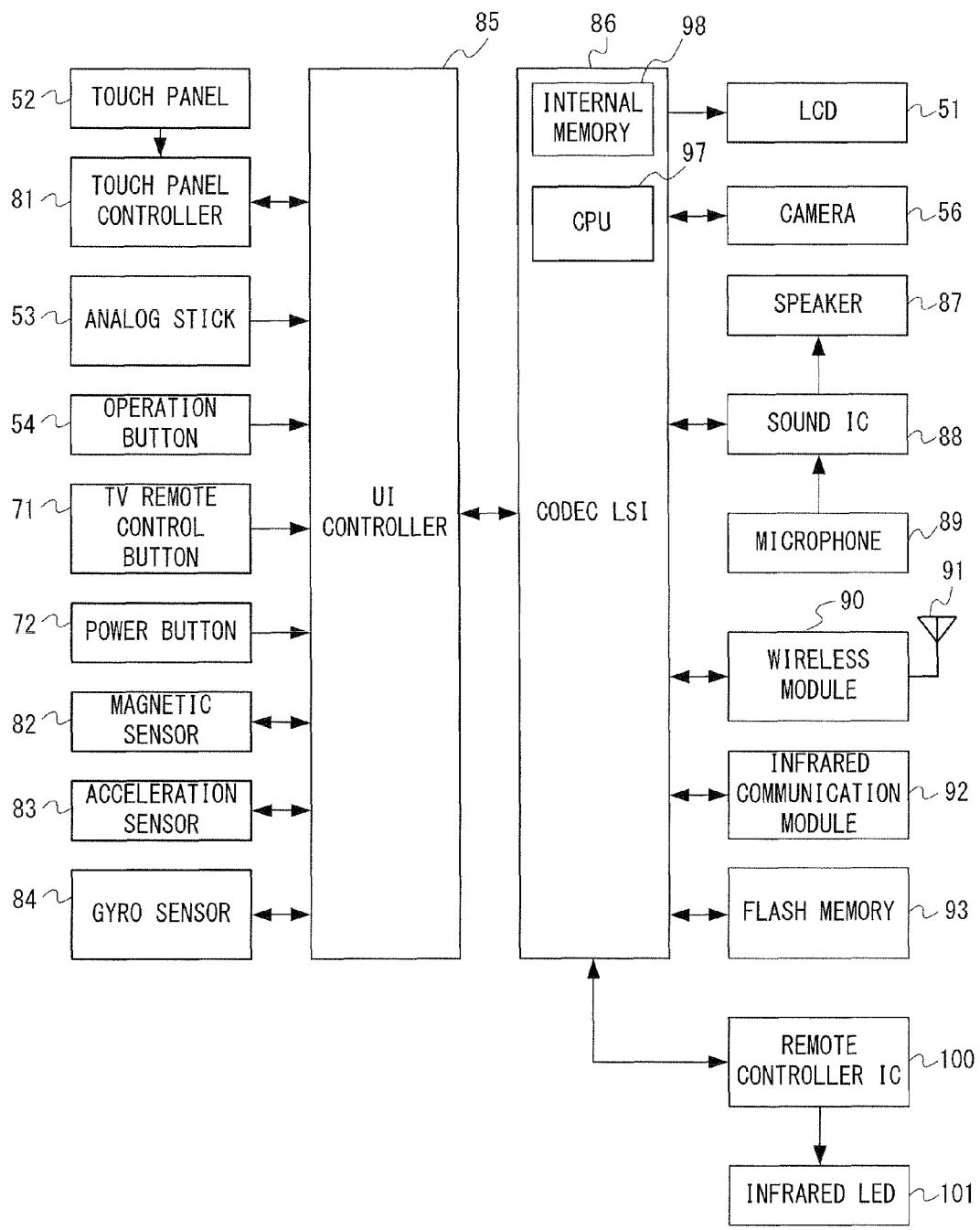
FIG. 4 is a block diagram showing an example non-limiting electric configuration of the input terminal device.

Next, referring to FIG. 4, an electric configuration of the input terminal device 7 is described. FIG. 4 is a block diagram showing an example non-limiting electric configuration of the input terminal device 7. As shown in FIG. 4, the input terminal device 7 has a touch panel controller 81, a magnetic sensor 82, an acceleration sensor 83, a gyro sensor 84, a user interface controller (UI controller) 85, a codec LSI 86, the speaker 87, a sound IC 88, a microphone 89, a wireless module 90, an antenna 91, the infrared communication module 92, a flash memory 93, a remote controller IC 100 and the infrared LED 101 besides the components shown in FIG. 3(a)-FIG. 3(c). These electronic components are mounted on an electronic circuit board and contained in the housing 50.

Although illustration is omitted, the input terminal device 7 is supplied with power from an integrated battery or an external power source.

The UI controller 85 is a circuit for controlling an input and an output of data to and from various input-output portions. The UI controller 85 is connected with the touch panel controller 81, the analog stick 53 (analog sticks 53A and 53B), the operation button 54 (respective operation buttons 54A-54L), the TV remote control button 71, the power button 72, the magnetic sensor 82, the acceleration sensor 83, and the gyro sensor 84.

Also, the UI controller 85 is connected to the codec LSI 86. The touch panel controller 81 is connected to the touch panel 52, and is a circuit for performing a control on the touch panel 52. The touch panel controller 81 generates touched position data in a predetermined format on the basis of a signal from the touch panel 52 and outputs it to the UI controller 85. The touched position data represents coordinates of the position (touched position) where an input is made on an input surface of the touch panel 52.

Here, the touch panel controller 81 performs reading signals from the touch panel 52 and generation of touched position data each predetermined time. Furthermore, from the UI controller 85 to the touch panel controller 81, various control instructions with respect to the touch panel 52 are output.

The analog stick 53 outputs stick data representing a direction in which the stick portion to be operated by the fingers of the user is slid (or tilted) and an amount of the sliding to the UI controller 85. Furthermore, the operation button 54 outputs operation button data representing an input status (whether to be pushed or not) with respect to each operation button 54A-54L to the UI controller 85.

The magnetic sensor 82 detects a bearing azimuth by sensing the strength and direction of the magnetic field. Bearing azimuth data representing the detected bearing azimuth is output to the UI controller 85. Additionally, from the UI controller 85 to the magnetic sensor 82, a control instruction with respect to the magnetic sensor 82 is output.

The acceleration sensor 83 is provided inside the housing 50, and detects a magnitude of a linear acceleration along each of the three-axis directions (x, y, z axes shown in FIG. 3(a)). The acceleration data representing the detected acceleration is output to the UI controller 85. Additionally, from the UI controller 85 to the acceleration sensor 83, a control instruction with respect to the acceleration sensor 83 is output.

The gyro sensor 84 is provided inside the housing 50, and detects an angular velocity about each of the three-axes of the aforementioned x axis, y axis and z axis. The angular velocity data representing the detected angular velocity is output to the UI controller 85. Additionally, from the UI controller 85 to the gyro sensor 84, a control instruction with respect to the gyro sensor 84 is output.

The UI controller 85 outputs operation data including the touched position data, the stick data, the operation button data, the bearing azimuth data, the acceleration data, and the angular velocity data from the respective components described above to the codec LSI 86.

The codec LSI 86 is a circuit for performing compression processing on data to be transmitted to the game apparatus 3 and expansion processing on the data transmitted from the game apparatus 3. The codec LSI 86 is connected with the LCD 51, the camera 56, the sound IC 88, the wireless module 90, the flash memory 93, the infrared communication module 92 and the remote controller IC 100. Also, the codec LSI 86 includes a CPU 97 and an internal memory 98.

The input terminal device 7 is adapted so as not to perform the game processing itself, but need to execute a minimum program for management and communication of the input terminal device 7. When the power is turned on, the CPU 97 reads the program stored in the flash memory 93 into the internal memory 98 and executes it to thereby activate the input terminal device 7. Here, the input terminal device 7 activates or suspends on the basis of operation data from the game apparatus 3, or activates or suspends on the basis of operations of the TV remote control button 71 and the power button 72. It should be noted that in this embodiment, the suspension of the input terminal device 7 means a sleep state in which power is supplied to a part of the circuit components (UI controller 85, codec LSI 86 and wireless module 90). Thus, as described above, in a case that the power is turned on (power-on), the input terminal device 7 is activated from the sleep state. Furthermore, a partial area of the internal memory 98 is used as a VRAM for the LCD 51. In addition, in a case that the input terminal device 7 functions as a remote controller capable of operating (controlling) the television 2, the CPU 97 specifies the operated (touched) button (button images 302a-302f described later) on the basis of the touched position data.

The camera 56 images an image according to an instruction from the game apparatus 3, and outputs image data corresponding to the imaged image to the codec LSI 86. Furthermore, from the codec LSI 86 to the camera 56, a control instruction such as an imaging instruction of an image, etc. with respect to the camera 56 is output.

The sound IC 88 is connected to the speaker 87 and the microphone 89, and is a circuit for controlling an input and output of audio data to and from the speaker 87 and the microphone 89. That is, in a case that audio data is received from the codec LSI 86, the sound IC 88 outputs a sound signal obtained by performing D/A conversion on the audio data to the speaker 87, to thereby make the speaker 87 output a sound. Also, the microphone 89 detects sound (voices and cracks, etc. of the user) propagated to the input terminal device 7, and outputs a sound signal indicating the sound to the sound IC 88. The sound IC 88 performs A/D conversion on the sound signal from the microphone 89, and outputs the audio data in the predetermined format to the codec LSI 86.

The codec LSI 86 transmits to the game apparatus 3 the image data from the camera 56, the audio data from the microphone 89, and the operation data (terminal operation data) from the UI controller 85 via the wireless module 90. In this embodiment, the codec LSI 86 performs compression processing on the image data and the audio data similar to the codec LSI 27. The terminal operation data and the compressed image data and audio data described above are output to the wireless module 90 as transmission data. The wireless module 90 is connected with the antenna 91, and the wireless module 90 transmits the aforementioned transmission data to the game apparatus 3 via the antenna 91. The wireless module 90 has a function similar to the terminal communication module 28 of the game apparatus 3. That is, the wireless module 90 has a function of connecting to the wireless LAN following the system based on the IEEE 802.11n standard, for example. The data to be transmitted may be encoded as required or may not be encoded.

As described above, in the transmission data transmitted from the input terminal device 7 to the game apparatus 3, the operation data (terminal operation data), the image data and the audio data are included.

Also, the infrared communication module 92 performs infrared communications with other devices following the IrDA standard, for example. The codec LSI 86 may contain the data received by the infrared communication in the transmission data as required and transmit it to the game apparatus 3.

The remote controller IC 100 generates operation data (hereinafter, referred to as "remote control operation data") for being transmitted to the television 2 according to predetermined transmission format data. Here, the predetermined transmission format data is decided depending on the kind of the television 2 (manufactures, models, etc.). As described later, the predetermined transmission format data is acquired from the game apparatus 3 and stored in the flash memory 93, and is read into the internal memory 98 when the input terminal device 7 functions as a remote controller device of the television 2. Then, the remote controller IC 100 outputs (transmits) the remote control operation data generated according to the predetermined transmission format data from the infrared LED 101.

Provision of the infrared LED 101 for outputting remote control operation data is because the infrared LED 101 is different in the output level from an infrared LED (not illustrated) provided to the infrared communication module 92.

Furthermore, in a case that the control data is included in the data received from the game apparatus 3, the codec LSI 86 and the UI controller 85 of the input terminal device 7 issue control instruction according to the control data to the respective components. As described above, the control data is data representing the control instruction to the respective components (camera 56, touch panel controller 81, respective sensors 82-84 and infrared communication module 92, in this embodiment) contained in the input terminal device 7. In this embodiment, as a control instruction represented by the control data, an instruction of operating each of the aforementioned components, and an instruction of suspending (stopping) the operation are conceivable. That is, the components that are not in use in the game may be suspended in order to reduce power consumption, and in this case, the transmission data transmitted from the input terminal device 7 to the game apparatus 3 is adapted so as not to include the data from the suspended components.

Here, separately from the control data, in response to an operation of the power button 24 of the game apparatus 3, data (operation instructing data) for instructing activation and suspension (sleep) of the input terminal device 7 itself is also transmitted from the game apparatus 3 to the input terminal device 7.

As described above, the input terminal device 7 has the operating means, such as the touch panel 52, the analog stick 53, and the operation button 54, but may be adapted to have other operating means in place of these operating means, or with these operating means in another embodiment.

Furthermore, the input terminal device 7 has the magnetic sensor 82, the acceleration sensor 83, and the gyro sensor 84 as sensors to calculate motions (including position or attitude, or changes in the position and attitude) of the input terminal device 7, but in another embodiment, it may be configured to have one or two of these sensors. Also, in another embodiment, in place of these sensors, or together with these sensors, it may be configured to have other sensors.

Additionally, the input terminal device 7 is configured to have the camera 56 and the microphone 89, but in another embodiment, it may not have the camera 56 and the microphone 89, or may have either one of them.

One example of a game to be executed in such a game system 1 is described. Here, one example of a baseball game is described. For example, a first player is a computer player, and a batter is operated by the computer (the CPU 10 of the game apparatus 3). A second player operates a pitcher by using the input terminal device 7.

Figure 5:
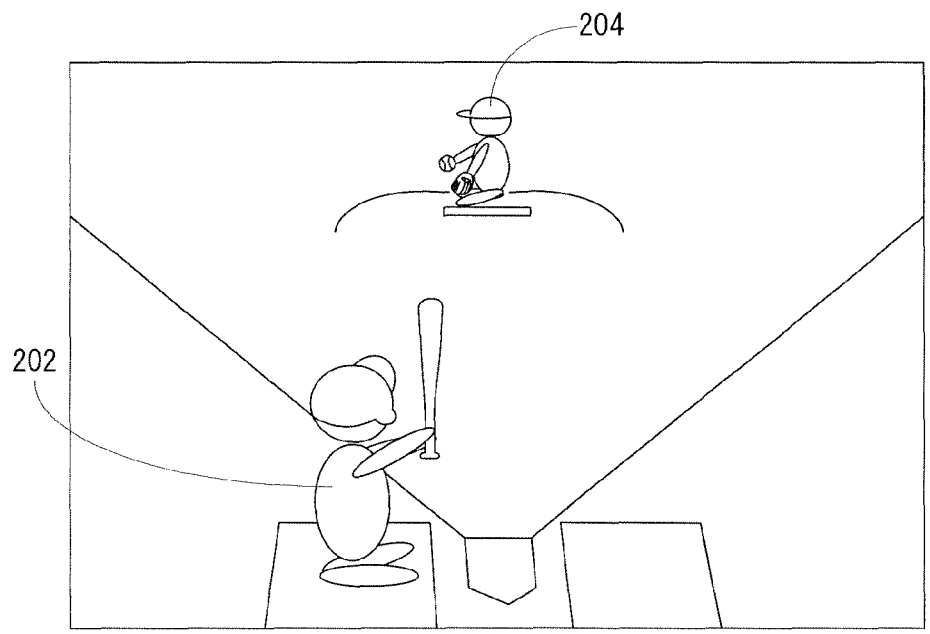
FIG. 5 shows an example non-limiting game image on a television and game image on the input terminal device.
Figure 5:
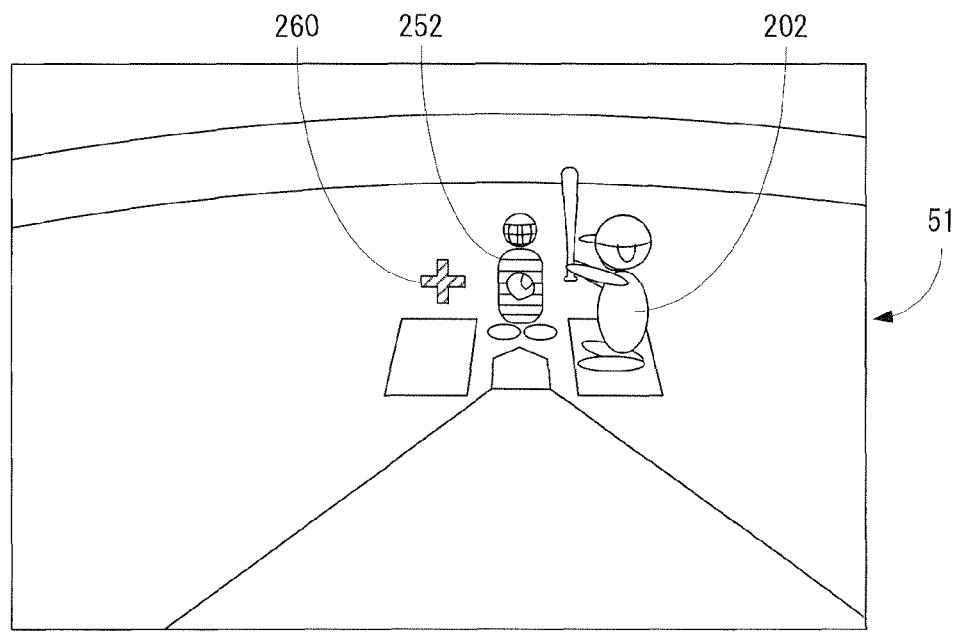

FIG. 5(A) shows one example of a game image for television 200 to be displayed on the television 2 in this game. The game image for television 200 shows a game space as seen from a side of a batter (batter object) 202 being an object to be controlled by the first player to a side of a pitcher (pitcher object) 204 being an object to be controlled by the second player. A first virtual camera for generating the game image for television 200 is arranged in a position to the rear of the batter object 202 so as to be directed from the batter object 202 to the pitcher object 204.

On the other hand, FIG. 5(B) shows one example of a game image for terminal 250 to be displayed on the input terminal device 7 in this game. The game image for terminal 250 shows the game space as seen from a side of the pitcher object 204 being an object to be controlled by the second player to a side of the batter object 202 being an object to be controlled by the first player. Also, on the game image for terminal 250, a cursor 260 for representing a direction in which the pitcher object 204 throws a ball object is displayed.

As described above, image data of the game image for terminal 250 is generated in the game apparatus 3. That is, the CPU 10 controls the second virtual camera used for generating the image data of the game image for terminal 250 on the basis of an attitude of the input terminal device 7. Here, the CPU 10 calculates the attitude of the input terminal device 7 on the basis of outputs from the inertial sensor (acceleration sensor 83 and gyro sensor 84) and the magnetic sensor 82, and controls the attitude of the second virtual camera for generating the image data of the game image for terminal 250. For example, the position of the second virtual camera is fixed at a predetermined position that decided in advance.

Furthermore, an operation method of the pitcher object 204 by the second player may be any method. For example, the CPU 10 moves the cursor 260 in accordance with an operation performed on the analog stick 53 of the input terminal device 7, and causes the pitcher object 204 to perform a motion of throwing a ball object toward the position designated by the cursor 260 in a case that a predetermined button out of the operation button 54 is pushed. Furthermore, the cursor 260 may be moved in correspondence with the attitude of the input terminal device 7 and may be moved according to a touch operation, in place of the operation performed on the analog stick 53.

Here, the batter object 202 may be operated by the first player except for the computer player. In such a case, by using the input terminal device 7 (or controller 5), the batter object 202 is operated. The operation method of the batter object 202 may be any method. For example, the CPU 10 may cause the batter object 202 to perform a motion of swinging a bat (object) in response to swinging (moving) of the input terminal device 7 (or controller 5) itself, and pushing of a predetermined button of the input terminal device 7 (or controller 5).

Figure 6:
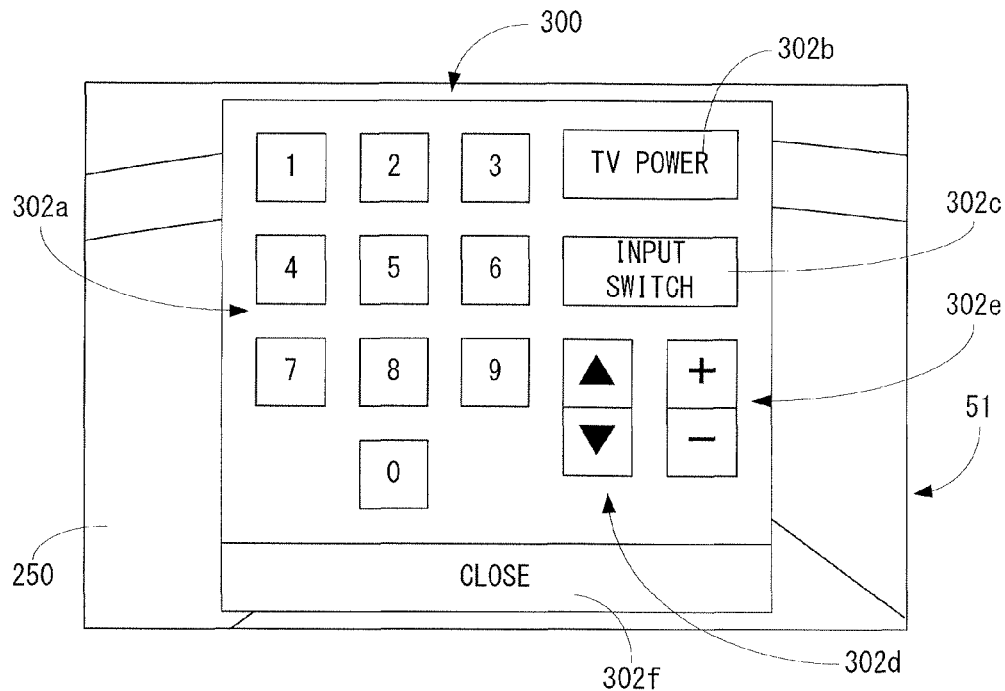
FIG. 6 shows an example non-limiting TV remote controller image on the input terminal device.
Figure 6:
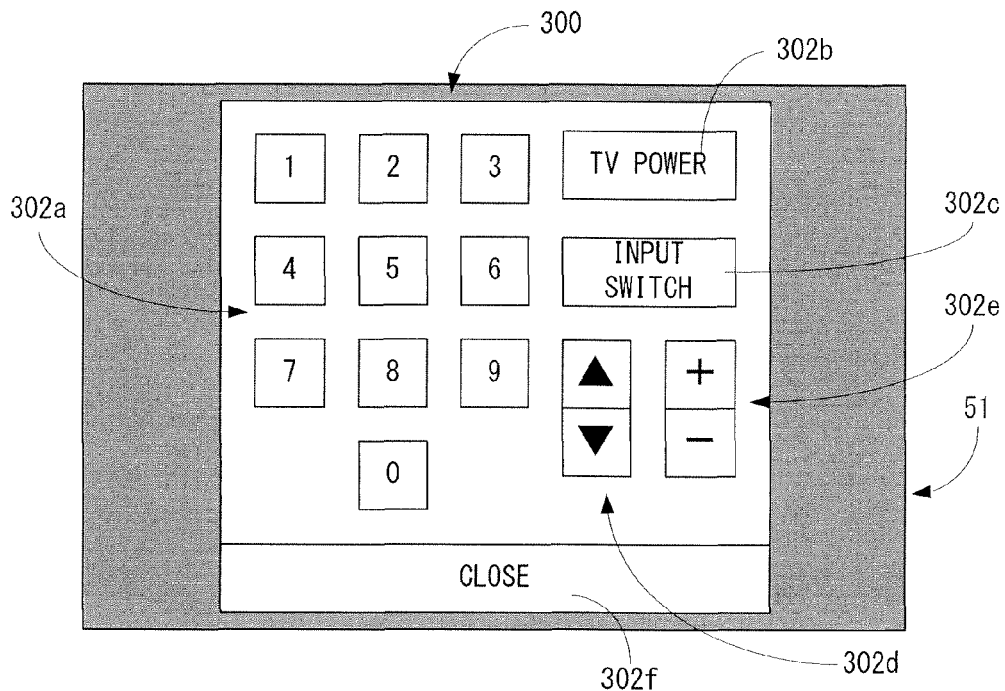

In this manner, the game (game application) can be executed. For example, when the TV remote control button 71 of the input terminal device 7 is pushed during execution of the game, the television control mode is set to thereby display a TV remote controller image 300 as shown in FIG. 6(A) on the LCD 51 of the input terminal device 7. In this embodiment, the TV remote controller image 300 is displayed so as to be overlaid at the front of the game image for terminal 250.

As shown in FIG. 6(A), on the TV remote controller image 300, a button image 302a, a button image 302b, a button image 302c, a button image 302d, a button image 302e and a button image 302f are displayed.

The button image 302a is numeric keys (ten key) and used for directly inputting a channel number. The button image 302b is used for turning ON and OFF the power of the television 2. The button image 302c is used for instructing a switch of an input of the television 2. The button image 302d is used for incrementing or decrementing the channel number by one level. The button image 302e is used for making the volume of the sound output from the speaker 2a of the television 2 high or low. The button image 302f is used for closing (erasing) the TV remote controller image 300. Here, when the TV remote controller image 300 is closed, the television control mode is ended.

The television control mode is merely set to the input terminal device 7, and never exerts an influence on the execution of applications, such as a game, etc. That is, by execution of the television control mode, processing of an application is never suspended or ended.

Accordingly, during execution of the game, when receiving image data and audio data from the game apparatus 3, the input terminal device 7 updates the game image for terminal 250, and outputs a game sound for terminal corresponding to the audio data. Here, in the television control mode, the game image for terminal 250 is always displayed at the back of the TV remote controller image 300. Also, the volume of the game sound for terminal corresponding to the audio data from the game apparatus 3 is slightly lowered. This is because the user or the player can hear an operation sound by an operation using the TV remote controller image 300.

Here, outputting the operation sound in response to an operation using the TV remote controller image 300 is due to the fact that if the touch panel 52 is touched, it is difficult to know whether or not an operation is accepted by the input terminal device 7 for lack of an operational feeling like a push button.

In the television control mode, when each button image 302a-302e is turned on, remote control operation data in response thereto is transmitted to the television 2. More specifically, the CPU 97 specifies any button image 302a-302f that is operated (turned on) from the touched position of the touch panel 52. For example, the resolution (detection accuracy) of the touch panel 52 is the same as the resolution of the LCD 51, and thus, if both of the coordinate systems are the same, coordinates on the screen of the LCD 51 can be easily known from the coordinates of the touched position (touched coordinates). Accordingly, the CPU 97 specifies the button image (302a-302f) displayed in the position of the coordinates on the LCD 51 corresponding to the touched coordinates as a touched button image (302a-302f).

Then, the remote controller IC 100 generates remote control operation data corresponding to the content of the operation assigned to each button image (302*a*-302*e*) specified by the CPU 97 according to an instruction from the CPU 97, and outputs it from the infrared LED 101. Here, in a case that the button image 302*f* is touched (turned on), the TV remote controller image 300 is erased (undisplayed), and the television control mode is ended. Also, in a case that the television control mode is set, if the TV remote control button 71 is pushed, the television control mode is ended similarly.

As described above, the remote control operation data is generated by coding the data (operation content data data) as to a content of the operation according to a transmission format depending on the kind of the television 2.

For example, in the flash memory 17 of the game apparatus 3, data of a transmission format (transmission format data) for each of a plurality of kinds (manufactures and models) is stored. Accordingly, in a case that an initial setting (remote controller setting) for functioning as a remote controller device is performed in the menu function, for example, when the kind of the television 2 is set (selected) by using the input terminal device 7, the transmission format data depending on the selected kind of the television 2 is downloaded into the input terminal device 7 from the game apparatus 3. Accordingly, the input terminal device 7 acquires the transmission format data from the game apparatus 3, and stores it in the flash memory 93. Then, in the input terminal device 7, when the television control mode is set, the transmission format data is read from the flash memory 93, and remote controller transmission data is generated in accordance therewith.

Additionally, in this embodiment, various sets of transmission format data are stored in the flash memory 17 of the game apparatus 3, but these may be stored in the flash memory 93 of the input terminal device 7. In such a case, the selected kind of the television 2 is stored, and when the television control mode is set, the transmission format data to be used is read according to the kind.

Furthermore, in the television control mode, in response to an operation performed on the input terminal device 7, terminal operation data is also transmitted to the game apparatus 3. In the present embodiment, in the television control mode, an operation (instruction) of turning ON and OFF the power of the game apparatus 3 is only made possible to the game apparatus 3, and therefore, even if an operation other than the operation of the power button 72 is performed, terminal operation data including no operation information (hereinafter, referred to as "dummy operation data") is generated and transmitted. That is, the dummy operation data based not on the operation information is generated and transmitted. For example, with respect to the dummy operation data, as each of various kinds of the operation information (operation button data, stick data, touched position data, acceleration data, angular velocity data, and bearing azimuth data), a null is described. Here, no operation information may be described.

The reason why the dummy operation data is thus generated is that it is only necessary to change the content of the terminal operation data, and it is not necessary to change the processing of transmitting the terminal operation data in the input terminal device 7 and the processing in the game apparatus 3. Also, in the input terminal device 7, the operation information is used without change to thereby generate and transmit remote controller transmission data to the television 2.

Here, in the television control mode, if an operation other than that on the power button 72 is performed, the terminal operation data may not be generated.

Also, in this embodiment, in the television control mode, not performing an operation other than the operation of turning ON and OFF the power of the game apparatus 3 (hereinafter, referred to as "another game operation") is assumed, but other game operations may be made possible. In such a case, similar to a mode other than the television control mode, in response to an operation by the user, the terminal operation data is generated and transmitted.

Here, as described above, in the television control mode, only the operation on the power button 72 is operative. Accordingly, in order to allow for an operation similar to the operation by using the TV remote controller image 300, a button image for turning ON and OFF the power of the game apparatus 3 may be displayed on the TV remote controller image 300.

Furthermore, the TV remote controller image 300 shown in FIG. 6(A) and FIG. 6(B) is merely one example, and the TV remote controller image 300 need not be restricted thereto. The design such as number of button images and the arrangement thereof can be changed as necessary. For example, the button image 302*a* of the ten key need not be provided.

Here, a description is made on a case that the television control mode is set during execution of the game, but this holds true for a case that applications except for the game and the menu function are executed in the input terminal device 7.

Although detailed description is omitted, even if the input terminal device 7 is in the television control mode, since the processing by the game apparatus 3 is not suspended and so forth, it is needless to say that the game processing is executed on the basis of the operation data from other input terminal devices 7 to which the television control mode is not set and controllers 5.

Although illustration is omitted, in a case that the power of the game apparatus 3 is turned off as well, the input terminal device 7 can operate the television 2 by being placed in the television control mode. In a case that the power of the game apparatus 3 is turned off, the input terminal device 7 is in a sleep state (during a sleep state) as described above. During the sleep state, power is only supplied to the UI controller 85, the codec LSI 86 and the wireless communication module 90. Then, in the input terminal device 7, an operation signal of the TV remote control button 71 or the power button 72 is acceptable, and operation data indicating activation from the game apparatus 3 is receivable.

Accordingly, in the sleep state, when the power button 72 of the input terminal device 7 is pushed, the input terminal device 7 is activated by the CPU 97, and terminal operation data including the operation information indicative of the power button 72 being pushed down is generated and transmitted as described above. In response thereto, the game apparatus 3 is activated.

Also, in the sleep state, when the TV remote control button 71 of the input terminal device 7 is pushed, the input terminal device 7 is activated by the CPU 97 similarly, and the television control mode is set to thereby display the TV remote controller image 300 as shown in FIG. 6(B) on the LCD 51.

Here, in the sleep state, in a case that the TV remote control button 71 is pushed, the game apparatus 3 is not activated and therefore, control data, image data and audio data from the game apparatus 3 are not transmitted to the input terminal device 7. Thus, on the LCD 51, only the TV remote controller image 300 is displayed, and no image is displayed at the back thereof.

It should be noted that in FIG. 6(B), that no image is displayed at the back of the TV remote controller image 300 is shown by filling with gray.

Furthermore, the case that the power of the game apparatus 3 is turned off is the same as the case that the power of the game apparatus 3 is turned on in a point that the operation data to the television 2 and the dummy operation data to the game apparatus 3 are generated and transmitted, and therefore, a duplicated description is omitted.

Thus, irrespective of the state of the game apparatus 3, in response to an operation of the TV remote control button 71, the television control mode is set to allow for an operation on the television 2. Here, the state of the game apparatus 3 means a state that the power of the game apparatus 3 is turned on (activated) or turned off (not activated), and state that in the game apparatus 3, an application is executed or not executed.

Here, in a case that the remote controller setting has not been performed (completed), the input terminal device 7 cannot be worked as a remote controller device. Accordingly, in this embodiment, in a case that the remote controller setting has not been completed, when the TV remote control button 71 is pushed, an image prompting the user to perform the remote a controller setting (setting prompting screen) is displayed on the LCD 51.

Figure 7:
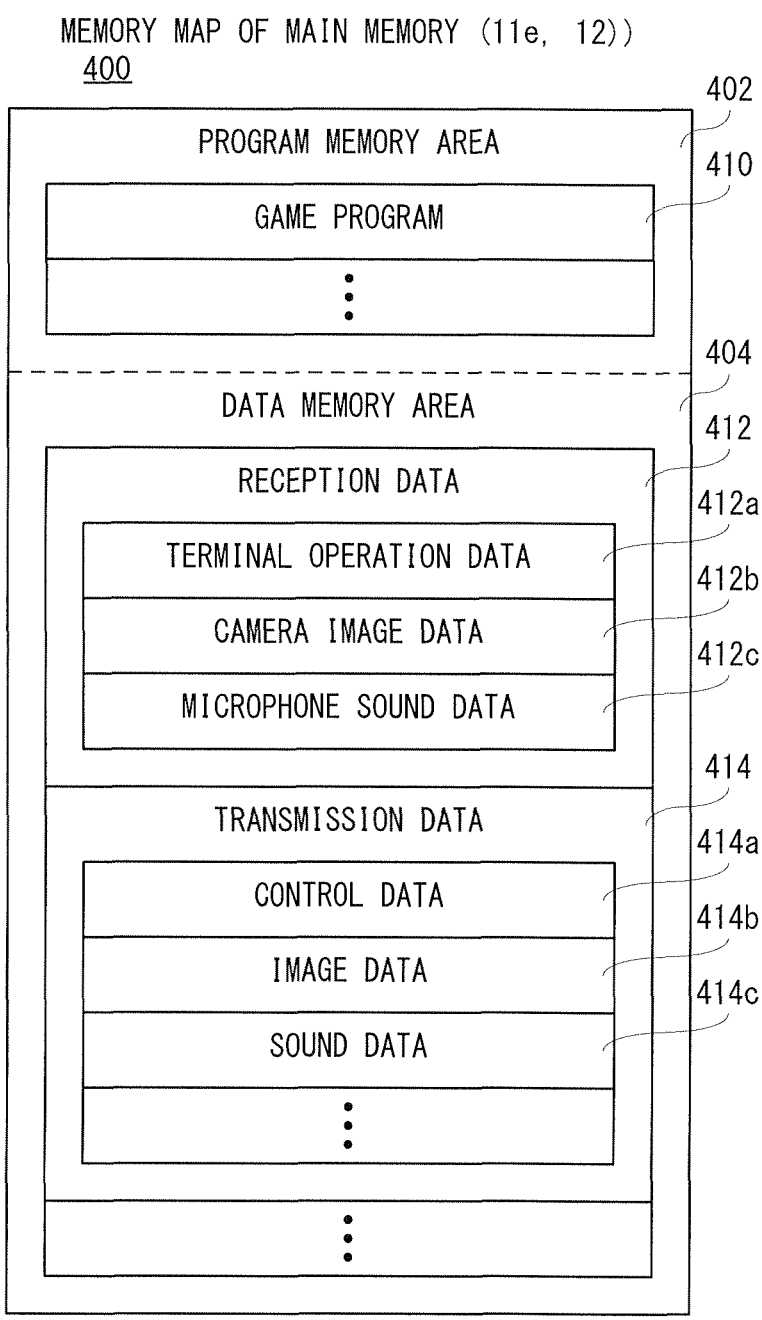
FIG. 7 shows an example non-limiting memory map of a main memory of the game apparatus shown in FIG. 2.

FIG. 7 shows an example non-limiting memory map 400 of the main memory (11e, 12) of the game apparatus 3 shown in FIG. 2. As shown in FIG. 7, the main memory (11e, 12) includes a program memory area 402 and a data memory area 404. In the program memory area 402, an information processing program (application program) such as a game program 410, etc. is stored. For example, at a proper timing after powering the game apparatus 3 on, a part or all of the game programs 410 are read from the optical disk 4 and stored in the main memory.

Here, the game program 410 may be acquired not from the optical disk 4 but from the flash memory 17 or external devices (via the Internet, for example) of the game apparatus 3. Furthermore, a part of the programs included in the game program 410 may be stored in advance in the game apparatus 3.

In a data memory area 404, reception data 412, transmission data 414, etc. are stored.

The reception data 412 is various data received from the input terminal device 7. The reception data 412 includes terminal operation data 412a, camera image data 412b, and microphone sound data 412c. In a case that a plurality of input terminal devices 7 are connected, a plurality of sets of the terminal operation data 412a, sets of the camera image data 412b and sets of the microphone sound data 412c are stored in correspondence with each input terminal device 7.

Although illustration is omitted, in a case that the controller 5 is used, data received from the controller 5 (controller operation data) is also included in the reception data 412.

The terminal operation data 412a is data indicating an operation performed on the input terminal device 7 by the user. The terminal operation data 412a is transmitted from the input terminal device 7, and received by the game apparatus 3 and stored in the main memory (11e, 12) thereof. The terminal operation data 412a includes operation button data, stick data, touched position data, acceleration data, angular velocity data, and bearing azimuth data as described above.

Here, in the main memory (11e, 12), predetermined number of terminal operation data may be stored from the latest one (lastly acquired) in order.

Additionally, the terminal operation data 412a is only necessary to be data indicating an operation by the user who operates the input terminal device 7, and may include only one of the aforementioned data.

The camera image data 412b is data indicating an image (camera image) imaged by the camera 56 of the input terminal device 7. The camera image data 412c is image data obtained by expanding the compressed image data from the input terminal device 7 by the codec LSI 27, and stored in the main memory (11e, 12) by the input-output processor 11a.

Here, in the main memory (11e, 12), predetermined number of camera image data may be stored from the latest one (lastly acquired) in order.

The microphone sound data 412c is data indicating a sound (microphone sound) detected by the microphone 89 of the input terminal device 7. The microphone sound data 412c is audio data obtained by expanding the compressed audio data transmitted from the input terminal device 7 by the codec LSI 27, and stored in the main memory (11e, 12) by the input-output processor 11a.

Here, in the main memory (11e, 12), predetermined number of microphone sound data may be stored from the latest one (lastly acquired) in order.

The transmission data 414 includes control data 414a, image data 414b, audio data 414c, etc. The control data 414a is data indicating a control instruction to the components contained in the input terminal device 7. The control data 414a indicates an instruction for controlling imaging by the camera 56, for example. The control data 414a is transmitted to the input terminal device 7 at an appropriate timing.

Here, in a case that the controller 5 is used, control data indicating a control instruction to the components (not illustrated) contained in the controller 5 is further included in the transmission data 414, and transmitted to the controller 5 at an appropriate timing.

The image data 414b is generated by the game processing, and is image data of a game image for terminal to be output from the input terminal device 7, image data of a menu image to be output from the input terminal device 7 according to a menu function, etc. The audio data 414c is generated by the game processing, and is audio data of a game sound for terminal to be output from the input terminal device 7 and audio data such as BGM, and sound effect.

Here, in a case that the controller 5 is used, the audio data 414c is also transmitted to the controller 5. It should be noted that in a case that different audio data is to be output between the input terminal device 7 and the controller 5, audio data to be output from the controller 5 is generated separately.

Although illustration is omitted, in the data memory area 404, data utilized in the game entire processioning (FIG. 9) described later is stored. For example, terminal attitude data, image recognition data, sound recognition data, etc. are stored. Furthermore, in the data memory area 404, various data utilized in the game processing, such as data indicating various parameters set to various objects appearing in the game, etc. is included.

Here, the terminal attitude data is data indicating the attitude of the input terminal device 7. The image recognition data is data indicating a result of predetermined image recognition processing performed on the camera image described above. The sound recognition data is data indicating a result of predetermined sound recognizing processing performed on the microphone sound described above.

Figure 8:
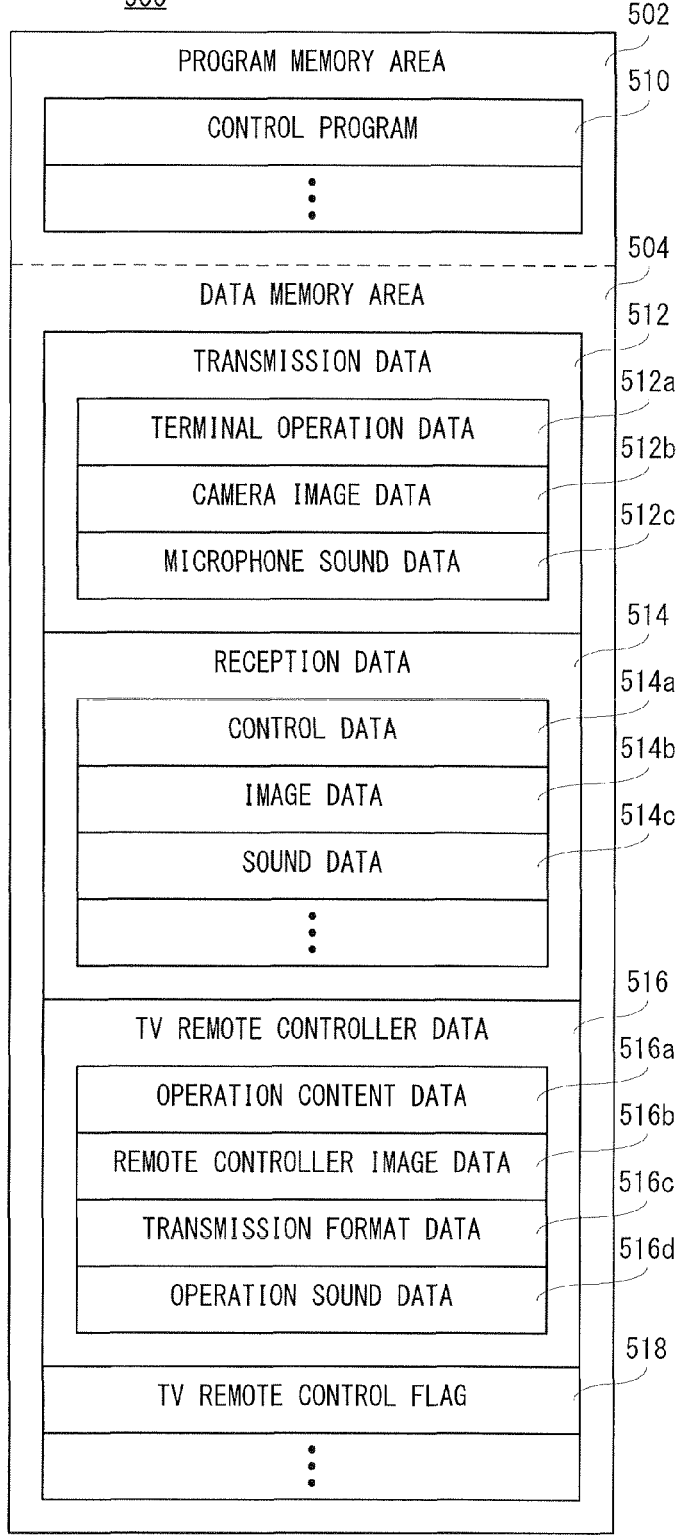
FIG. 8 shows an example non-limiting memory map of an internal memory of the input terminal device shown in FIG. 4.

FIG. 8 shows an example non-limiting memory map 500 of an internal memory 98 of the input terminal device 7 shown in FIG. 4. As shown in FIG. 8, the internal memory 98 includes a program memory area 502 and a data memory area 504.

In the program memory area 502, programs, such as a control program 510, etc. are stored. The control program 510 is a program for executing the entire processing of the input terminal device 7.

In the data memory area 504, transmission data 512, reception data 514 and TV remote controller data 516 are stored. Also, in the data memory area 504, a TV remote control flag 518 is provided.

The transmission data 512 includes terminal operation data 512a, camera image data 512b and microphone sound data 512c. These are the same in content as the terminal operation data 412a, the camera image data 412b and the microphone sound data 412c contained in the above-described reception data 412, and therefore, a redundant description is omitted.

Similarly, the reception data 514 includes control data 514a, image data 514b, audio data 514c, etc. These are the same in content as the control data 414a, image data 414b and audio data 414c contained in the above-described transmission data 414, and therefore, a redundant description is omitted.

The TV remote controller data 516 includes operation content data 516a, remote controller image data 516b, transmission format data 516c and operation sound data 516d.

The operation content data 516a is data of a content of an operation (operation information) corresponding to any button image 302a-302f touched on the TV remote controller image 300 shown in FIG. 6(A) and FIG. 6(B).

The remote controller image data 516b is image data as to the TV remote controller image 300 shown in FIG. 6(A) and FIG. 6(B).

The transmission format data 516c is data as to a transmission format acquired from the game apparatus 3 by being brought into correspondence with the kind of the television 2 set to the input terminal device 7.

The operation sound data 516d is sound (sound effect) data as to an operation sound to be output in a case that any button image 302a-302f displayed on the TV remote controller image 300 shown in FIG. 6(A) and FIG. 6(B). Although the detailed description is omitted, the operation sound may be the same among the button images 302a-302f, or may be different among the button images 302a-302f.

It should be noted that in this embodiment, the remote controller image data 516b, the transmission format data 516c and the operation sound data 516d are read from the flash memory 93 when the television control mode is set.

The TV remote control flag 518 is a flag for determining whether or not the television control mode is set. The TV remote control flag 518 is constructed of one bit register. When in a case that the television control mode is set, the TV remote control flag 518 is turned on, and a data value "1" is set to the register. On the other hand, in a case that the television control mode is not set, the TV remote control flag 518 is turned off, and a data value "0" is set to the register.

Although illustration is omitted, in the data memory area 504, other data necessary for execution of the control program 510 is stored, and other flags and counters (timers) are provided.

Figure 9:
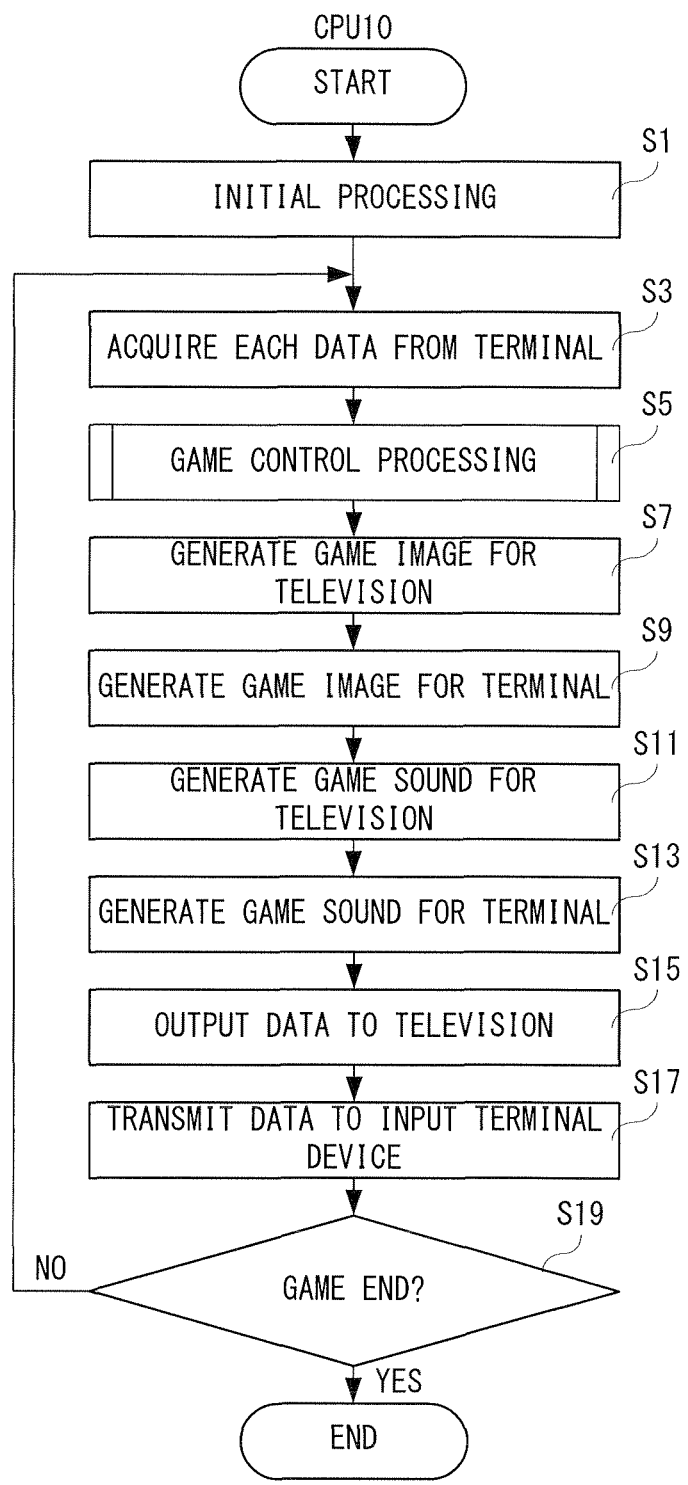
FIG. 9 shows an example non-limiting flowchart showing game entire processing by the CPU of the game apparatus shown in FIG. 2.

FIG. 9 shows an example non-limiting flowchart showing game entire processioning by the CPU 10 provided in the game apparatus 3 shown in FIG. 2. Here, processing in each step of the flowchart shown in FIG. 9 is merely one example, and the order of processing in the respective steps may be interchanged if a similar result can be obtained. Also, values of the variables and threshold values utilized in the determining step are merely one example, and other values may be adopted as required. Furthermore, in the embodiment, a description will be made that the CPU 10 executes the processing in the respective steps of the flowchart shown in FIG. 9, but a processor and a dedicated circuit other than the CPU 10 may execute a part of the processing.

When the power of the game apparatus 3 is turned on, prior to execution of the game entire processioning, the CPU 10 executes an activation program stored in a boot ROM not shown to thereby initialize each unit such as the main memory (11e, 12), etc. Then, the CPU 10 reads the game program 410 stored in the optical disk 4 into the main memory (11e, 12) to start execution of the game program 410.

When starting the game entire processioning, the CPU 10 executes initial processing in a step S1. The initial processing is processing of constructing a virtual game space, arranging each object appearing in the game space in an initial position, and setting initial values of various parameters utilized in the game processing, for example.

In a step S3, the CPU 10 acquires various data transmitted from the input terminal device 7.

Here, in a case that the controller 5 is used, the CPU 10 also acquires controller operation data transmitted from the controller 5 in the step S3. Here, in a case that only the controller 5 is used, only the controller operation data is acquired.

Figure 10:
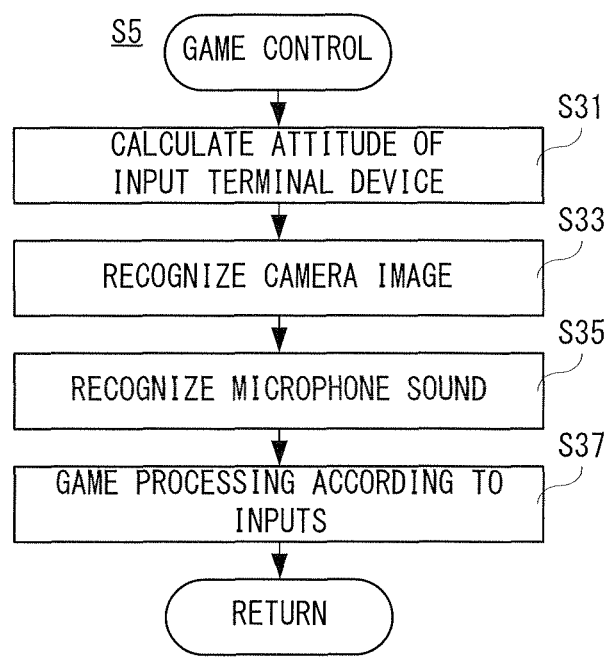
FIG. 10 shows an example non-limiting flowchart showing game control processing by the CPU of the game apparatus shown in FIG. 2.

In a next step S5, the CPU 10 executes game control processing. The game control processing is processing of advancing the game by executing processing, etc. of moving an object within the game space according to a game operation by the user. In this embodiment, the user can mainly perform various games by using the input terminal device 7. With reference to FIG. 10, the game control processing is described below.

FIG. 10 shows an example non-limiting flowchart showing game control processing by the CPU 10 shown in FIG. 2. Here, a series of processing shown in FIG. 10 is various processing to be executed in a case that the input terminal device 7 is used as an operating device, but the entire processing may not necessarily be executed, and only a part of the processing may be executed depending on the kind and the content of the game.

In the game control processing, in a step S31, the CPU 10 first calculates the attitude of the input terminal device 7. Here, in a case that dummy operation data is received from the input terminal device 7, the CPU 10 does not execute the processing (game processing) in the step S31. This holds true for steps S33, S35, S37 described later. Thus, in the game apparatus 3, when the dummy operation data from the input terminal device 7 is received, that is, in a case that the television control mode is set to the input terminal device 7, the game processing is not merely performed on the basis of the dummy operation data, and the game processing itself is never suspended or ended.

Here, if the controller 5 is used, the CPU 10 also calculates an attitude of the controller 5 in the step S31. It should be noted that if only the controller 5 is used, only the attitude of the controller 5 is calculated.

Succeedingly, in the step S33, the CPU 10 executes camera image recognition processing. That is, the CPU 10 performs predetermined recognition processing on the camera image data 104, and stores data indicating the recognition result as image recognition data in the main memory (11e, 12).

In the succeeding step S35, the CPU 10 executes microphone sound recognition processing. That is, the CPU 10 performs predetermined recognition processing on the microphone sound data 412d, and stores data indicating the result of the recognition processing as sound recognition data in the main memory (11e, 12).

Next, in the step S37, the CPU 10 performs game processing according to a game input, and returns to the game entire processing shown in FIG. 9. Here, the game input may include any data if only it is data transmitted from the input terminal device 7, or data acquired from this data. More specifically, the game input may be, in addition to each data included in the terminal operation data 412a, data acquired from each of the data (terminal attitude data, image recognition data and sound recognition data).

Here, the game input may include controller operation data transmitted from the controller 5 and controller attitude data acquired from the data.

Also, the detail of the game processing in the step S37 may be any kinds, such as processing of moving objects (characters) appearing in the game, processing of controlling the virtual camera, or processing of moving the cursor displayed on the screen, for example. Furthermore, it may be processing of utilizing a camera image (or a part thereof) as a game image, a microphone sound as a game sound, or the like.

Returning to FIG. 9, in a step S7, the CPU 10 and the GPU 11b generate a game image for television to be displayed on the television 2. That is, the CPU 10 and the GPU 11b reads the data indicating the result of the game control processing in the step S5 from the main memory (11e, 12) and reads the data necessary for generating a game image from the VRAM 11d, to thereby generate the game image for television.

In a next step S9, the CPU 10 and the GPU 11b generate a game image for terminal to be displayed on the input terminal device 7. The game image for terminal is also only necessary to be one indicating the result of the game control processing in the step S5 similar to the game image for television described above, and may be generated by any method.

Succeedingly, in a step S11, the CPU 10 generates a game sound for television to be output to the speaker 2a of the television 2. That is, the CPU 10 makes the DSP 11c generate a game sound depending on the result of the game control processing in the step S5.

Next, in a step S13, the CPU 10 generates a game sound for terminal to be output to the speaker 87 of the input terminal device 7. That is, the CPU 10 makes the DSP 11c generate a game sound depending on the result of the game control processing in the step S5.

It should be noted that in a case that the game sound for television and the game sound for terminal are identical with each other, the processing in the step S13 need not be executed.

Here, in a case that the controller 5 is used, the CPU 10 generates a game sound to be output to the controller 5 in the step S13.

Succeedingly, in a step S15, the CPU 10 outputs the game image and the game sound to the television 2. More specifically, the CPU 10 transmits the image data of the game image for television stored in the VRAM 11d and the audio data of the game sound for television generated by the DSP 11c in the step S11 to the AV-IC 15.

Next, in a step S17, the CPU 10 transmits the game image and the game sound to the input terminal device 7. More specifically, the image data of the game image for terminal stored in the VRAM 11d and the audio data generated by the DSP 11c in the step S13 are transmitted to the codec LSI 86 by the CPU 10 and subject to predetermined compression processing by the codec LSI 86. In addition, the data of the image and sound to which the compression processing is subject are transmitted to the input terminal device 7 by the terminal communication module 28 via the antenna 29. In the input terminal device 7, the data of the image and the sound transmitted from the game apparatus 3 are received by the wireless module 90, and subject to predetermined expansion processing by the codec LSI 86. The image data on which the expansion processing is performed is output to the LCD 51, and the audio data on which the expansion processing is performed is output to the sound IC 88.

Here, in a case that the controller 5 is used, the audio data generated in the S13 is transmitted to the controller 5 in the step S17.

Then, in a step S19, the CPU 10 determines whether or not the game is to be ended. The determination in the step S19 is performed based on whether or not the game is over, or whether or not the user performs an instruction of suspending the game, for example.

If "NO" in the step S19, that is, if the game is not to be ended, the process returns to the step S3. On the other hand, if "YES" in the step S19, that is, if the game is to be ended, the game entire processing is ended.

Figure 11:
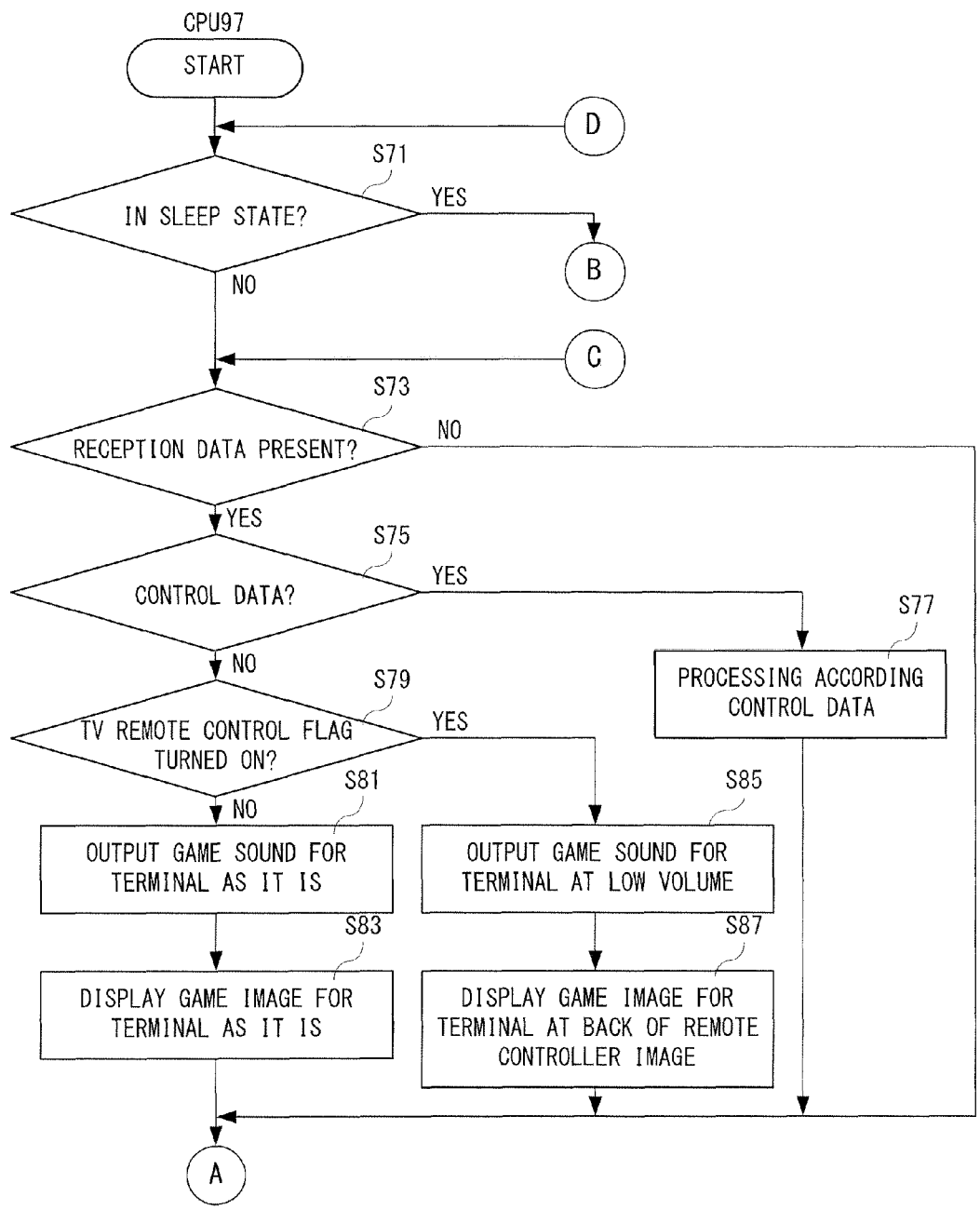
FIG. 11 shows an example non-limiting a first part of a flowchart showing control processing by the CPU of the input terminal device shown in FIG. 4.

FIG. 11-FIG. 16 show an example non-limiting flowcharts showing control processing by the CPU 97 of the input terminal device 7 shown in FIG. 4. As shown in FIG. 11, when starting the control processing, the CPU 97 determines whether or not it is in the sleep state in a step S71. If "YES" in the step S71, that is, if it is in the sleep mode, the process proceeds to a step S143 shown in FIG. 16.

On the other hand, if "NO" in the step S71, that is, if it is not in the sleep mode, it is determined whether or not the reception data 514 is present in a step S73. The CPU 97 executes reception processing in a task different from that of the control processing, and stores the data transmitted from the game apparatus 3 as reception data 514 in the internal memory 98. Accordingly, in the step S73, the CPU 97 determines whether or not the reception data 514 is stored in the data memory area 504.

Figure 12:
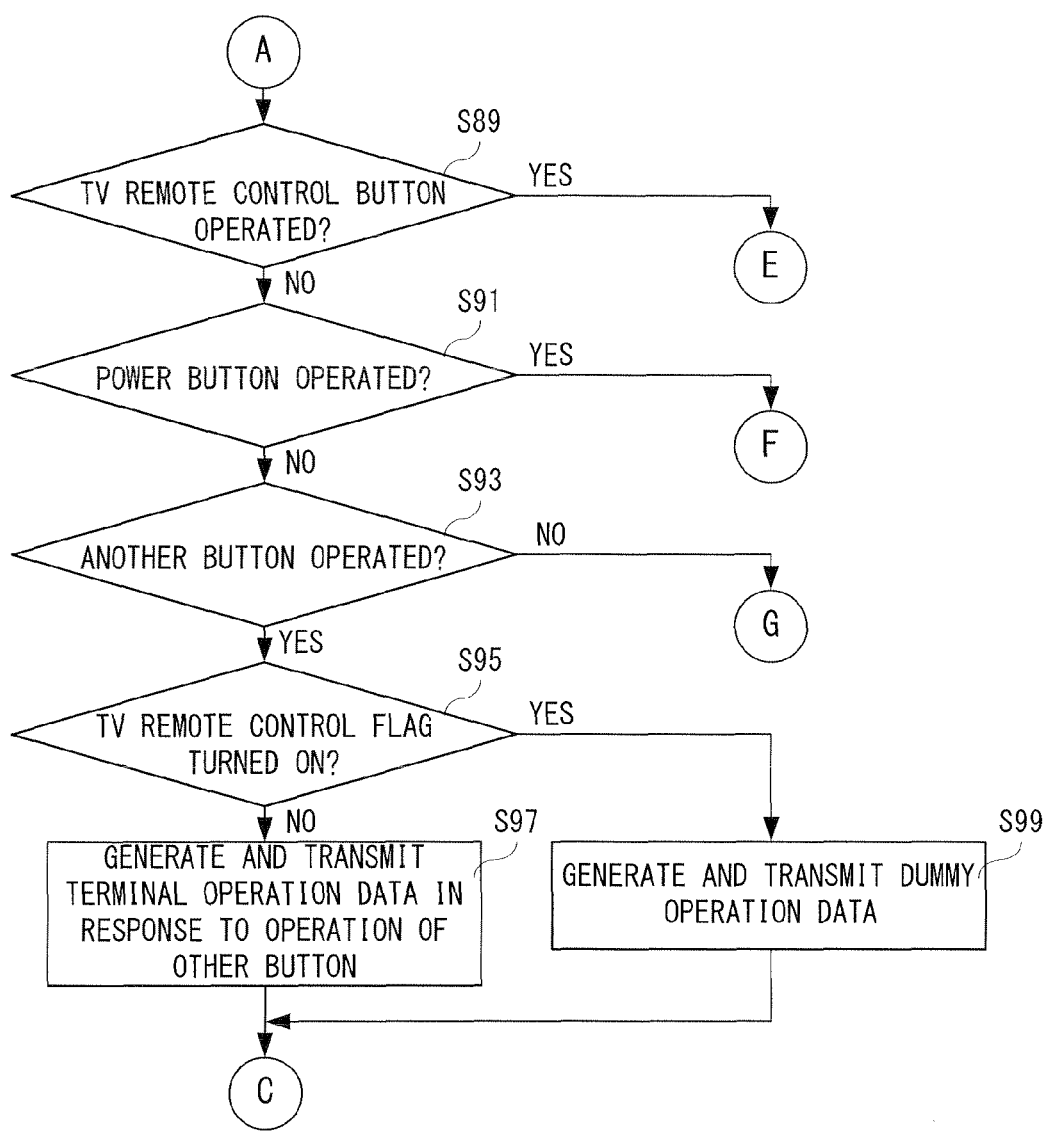
FIG. 12 shows an example non-limiting a second part of the flowchart showing the control processing by the CPU of the input terminal device shown in FIG. 4.

If "NO" in the step S73, that is, if the reception data 54 is not present, the process proceeds to a step S89 shown in FIG. 12 as it is. On the other hand, if "YES" in the step S73, that is, if the reception data 514 is present, it is determined whether or not it is the control data 514a in a step S75. If "YES" in the step S75, that is, if it is the control data 514a, processing according to the control data 514a is executed in a step S77, and the process proceeds to the step S89 shown in FIG. 12. For example, in the step S77, the CPU 97 operates each component, such as the camera 56, the touch panel controller 81, each of the sensors 82-84 and the infrared communication module 92, suspends (stop) the operation.

Alternatively, if "NO" in the step S75, it is determined that it is the image data and the audio data, and it is determined whether or not the TV remote control flag 518 is turned on in a step S79. If "NO" in the step S79, that is, if the TV remote control flag 518 is turned off, it is determined that the television control mode is not set, and in a step S81, the game sound for terminal is output as it is, and the game image for terminal 250 is displayed (updated) as it is in a step S83, and the process proceeds to the step S89 shown in FIG. 12.

On the other hand, if "YES" in the step S79, that is, if the TV remote control flag is turned on, it is determined that the television control mode is set, the game sound for terminal is output at a low volume in a step S85, the game image for terminal 250 is displayed (updated) at the back of the TV remote controller image 300 in a step S87, and the process proceeds to the step S89 shown in FIG. 12.

Here, in the steps S81-S87, the description is made, assuming that the image data 514b and the audio data 514c are included in the reception data 514, but if either one of them is included, the processing in the step S81-S85 is omitted suitably.

As shown in FIG. 12, in the step S89, it is determined whether or not the TV remote control button 71 is operated (turned on). If "YES" in the step S89, that is, if the TV remote control button 71 is operated, the process proceeds to a step S101 shown in FIG. 13. On the other hand, if "NO" in the step S89, that is, if the TV remote control button 71 is not operated, it is determined whether or not the power button 72 is operated in a step S91.

Figure 14:
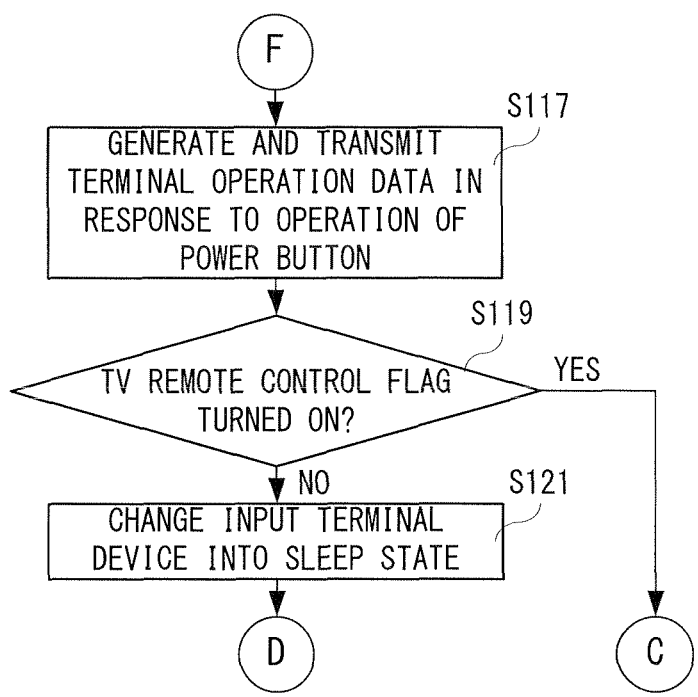
FIG. 14 shows an example non-limiting a fourth part of the flowchart showing the control processing by the CPU of the input terminal device shown in FIG. 4.

If "YES" in the step S91, that is, if the power button 72 is operated, the process proceeds to a step S117 shown in FIG. 14. On the other hand, if "NO" in the step S91, that is, if the power button 72 is not operated, it is determined whether or not another button (operation button 54) is operated in a step S93.

Figure 15:
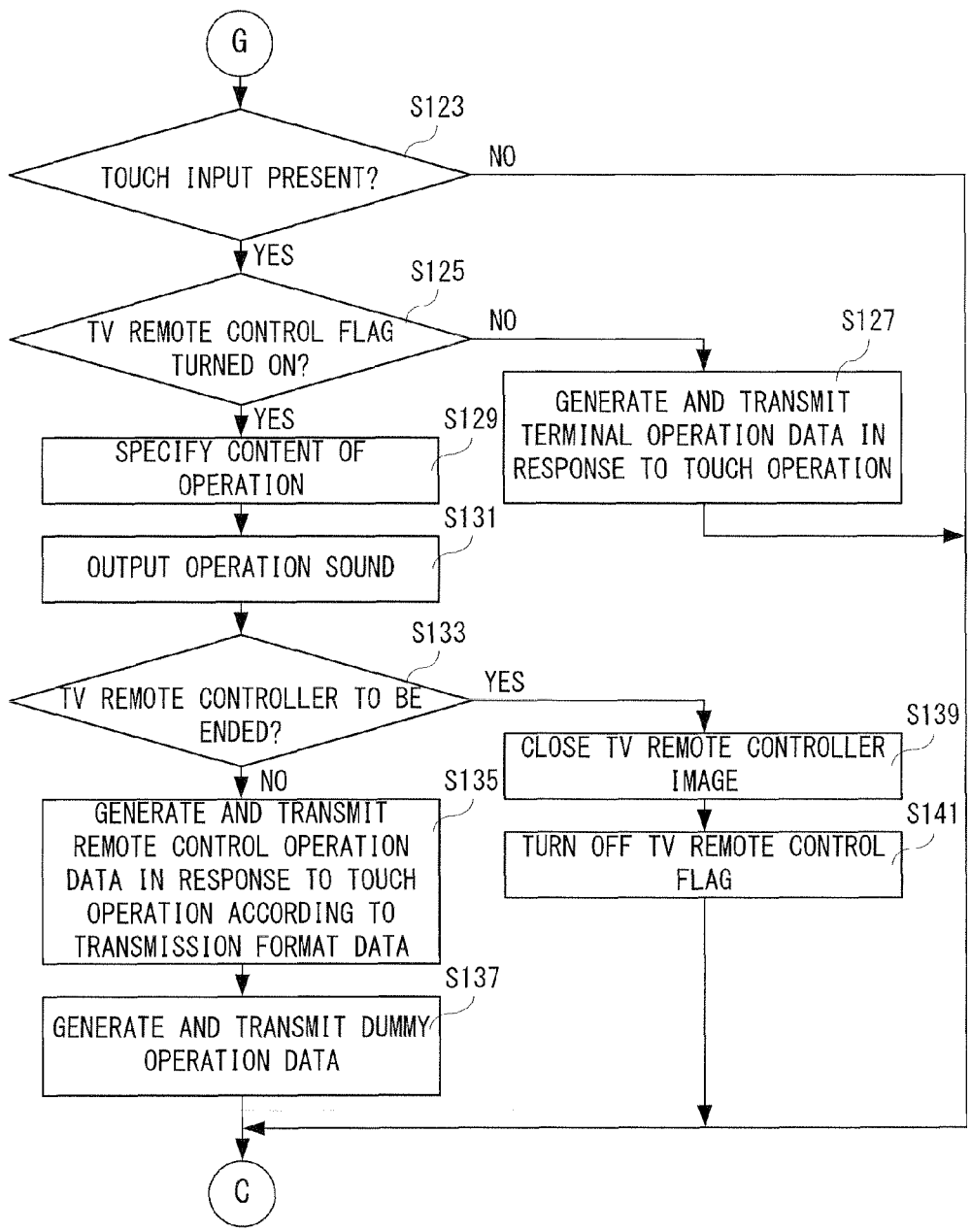
FIG. 15 shows an example non-limiting a fifth part of the flowchart showing the control processing by the CPU of the input terminal device shown in FIG. 4.

If "NO" in the step S93, that is, if another button is not operated, the process proceeds to a step S123 shown in FIG. 15. On the other hand, if "YES" in the step S93, that is, if another button is operated, it is determined whether or not the TV remote control flag 518 is turned on in a step S95. That is, the CPU 97 determines whether or not the television control mode is set.

If "NO" in the step S95, that is, if the TV remote control flag 518 is turned off, it is determined that the television control mode is not set, the terminal operation data in response to the operation of the other button is generated and transmitted in a step S97, and the process returns to the step S73. That is, in the step S97, the CPU 97 generates the terminal operation data following the IEEE 802.11n standard, and transmits it from the wireless module 90 via the antenna 91. Accordingly, the content of the operation by the user is input to the game apparatus 3. In response thereto, in the game apparatus 3, the game processing, etc. is executed as described above.

This holds true for a case that the terminal operation data is generated and transmitted below, but in a case that dummy operation data is generated and transmitted, in the game apparatus 3, the game processing is never performed based on the dummy operation data as described above.

On the other hand, if "YES" in the step S95, that is, if the TV remote control flag 518 is turned on, it is determined that the television control mode is set, dummy operation data is generated and transmitted in a step S99, and the process returns to the step S73.

Figure 13:
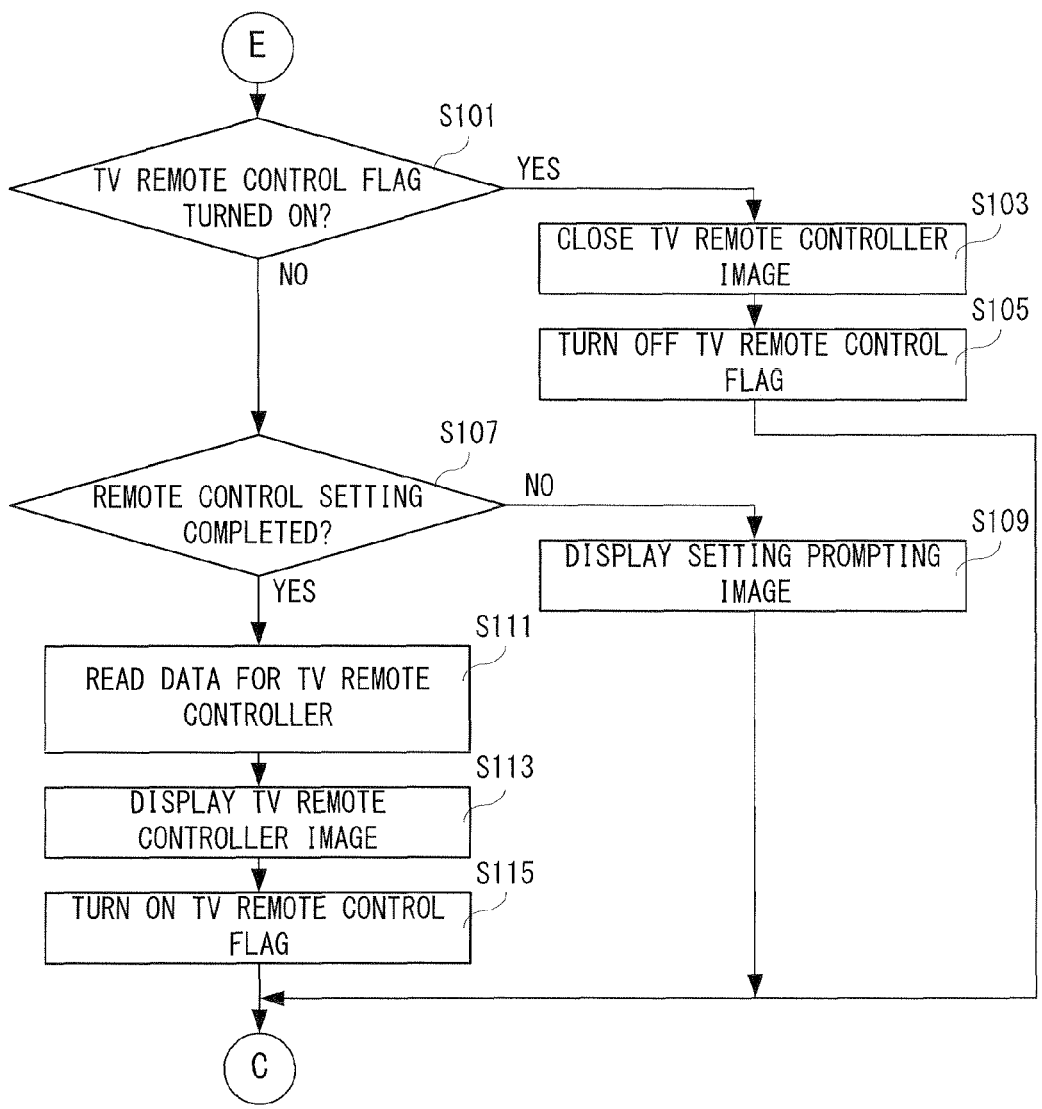
FIG. 13 shows an example non-limiting a third part of the flowchart showing the control processing by the CPU of the input terminal device shown in FIG. 4.

As described above, when the TV remote control button 71 is operated while it is not in the sleep state, "YES" is determined in the step S89, and it is determined whether or not the TV remote control flag 518 is turned on in the step S101 shown in FIG. 13.

If "YES" in the step S101, that is, if the TV remote control flag 518 is turned on, the TV remote controller image 300 is closed in a step S103, the TV remote control flag 518 is turned off in a step S105, and the process returns to the step S73 shown in FIG. 11. That is, the CPU 97 ends the television control mode.

On the other hand, if "NO" in the step S101, that is, if the TV remote control flag 518 is turned off, it is determined whether or not the remote controller setting is completed in a step S107. Here, the CPU 97 determines whether or not the transmission format data 516c is stored in the flash memory 93.

If "NO" in the step S107, that is, if the remote controller setting is not completed, the setting prompting screen is displayed on the LCD 51 in a step S109, and the process returns to the step S73. Although illustration is omitted, the aforementioned setting prompting screen is displayed for several seconds and then erased.

On the other hand, if "YES" in the step S107, that is, if the remote controller setting is completed, the data for TV remote controller is read from the flash memory 93 in a step S111. More specifically, the CPU 97 reads the remote controller image data 516b, the transmission format data 516c and the operation sound data 516d from the flash memory 93, and stores them in the data memory area 504 of the internal memory 98.

Succeedingly, in a step S113, the TV remote controller image 300 is displayed on the LCD 51. At this time, as shown in FIG. 6(A), the TV remote controller image 300 is displayed at the front of the game image for terminal 250. Then, in a step S115, the TV remote control flag 518 is turned on, and the process returns to the step S73.

Additionally, as described above, in a case that it is not in the sleep state, when the power button 72 is operated, "YES" is determined in the step S91, and the terminal operation data in response to an operation of the power button 72 is generated and transmitted in the step S117 shown in FIG. 14. Next, in a step S119, it is determined whether or not the TV remote control flag 518 is turned on.

If "YES" in the step S119, that is, if the TV remote control flag 518 is turned on, since the television 2 is being operated, or the television 2 may be operated, the process returns to the step S73 shown in FIG. 11 as it is. On the other hand, if "NO" in the step S119, that is, if the TV remote control flag 518 is turned off, it is determined that the television control mode is not set, the input terminal device 7 is changed into the sleep state in a step S121, and the process returns to the step S71 shown in FIG. 11. Here, in the step S121, according to an instruction from the CPU 97, a power supply to the UI controller 85, the codec LSI 86 and the wireless module 90 is continued, and a power supply to the other circuit components is suspended.

As described above, in a case that it is not in the sleep state, if the operation button 54, the TV remote control button 71 and the power button 72 are not operated, "NO" is determined in the step S93, and it is determined whether or not a touch input is present in the step S123 shown in FIG. 15.

If "NO" in the step S123, that is, if a touch input is not present, the process returns to the step S73 as it is. Although the illustration is omitted, in a case that a camera image is imaged, or a sound is detected in the input terminal device 7, and if "NO" in the step S123, the camera image data and the audio data are transmitted to the game apparatus 3, and then, the process returns to the step S73. On the other hand, if "YES" in the step S123, that is, if a touch input is present, it is determined whether or not the TV remote control flag 518 is turned on in a step S125.

If "NO" in the step S125, that is, if the TV remote control flag 518 is turned off, terminal operation data in response to a touch operation is generated and transmitted in a step S127, and the process returns to the step S73 shown in FIG. 11. On the other hand, if "YES" in the step S125, that is, if the TV remote control flag 518 is turned on, a content of the operation is specified in a step S129. Here, the CPU 97 specified the touched button image (302a-302f) on the basis of the touched position data, and specifies the content of the operation assigned to the specified button image (302a-302f). Accordingly, the operation content data 516a corresponding to the content of the operation is stored in the data memory area 504.

In a succeeding step S131, an operation sound according to an operation of the button image (302a-302f) is output. That is, the CPU 97 outputs the operation sound data 516d in response to an operation of the button image (302a-302f).

In a next step S133, it is determined whether or not the TV remote controller is to be ended. Here, the CPU 97 determines whether or not the content of the operation specified in the step S129 is closing the TV remote controller image 300.

If "NO" in the step S133, that is, if the TV remote controller is not to be ended, remote control operation data in response to the touch operation is generated and transmitted according to the transmission format data 516*c* in a step S135, dummy operation data is generated and transmitted in a step S137, and the process returns to the step S73 shown in FIG. 11.

Here, in the step S135, the remote controller IC 100 generates remote control operation data obtained by coding the operation content data 516*a* according to the transmission format data 516*c* under the instruction of the CPU 97, and outputs it from the infrared LED 101. Accordingly, the remote control operation data is transmitted by infrared rays.

On the other hand, if "YES" in the step S133, that is, if the TV remote controller is to be ended, the TV remote controller image 300 is closed in a step S139, the TV remote control flag 518 is turned off in a step S141, and the process returns to the step S73 shown in FIG. 11. By the processing in the step S139, the input terminal device 7 is set (shifted) to a mode capable of transmitting (inputting) the terminal operation data to the game apparatus 3. That is, a mode capable of making an input to the game (application) executed in the game apparatus 3 (application mode) is set.

Figure 16:
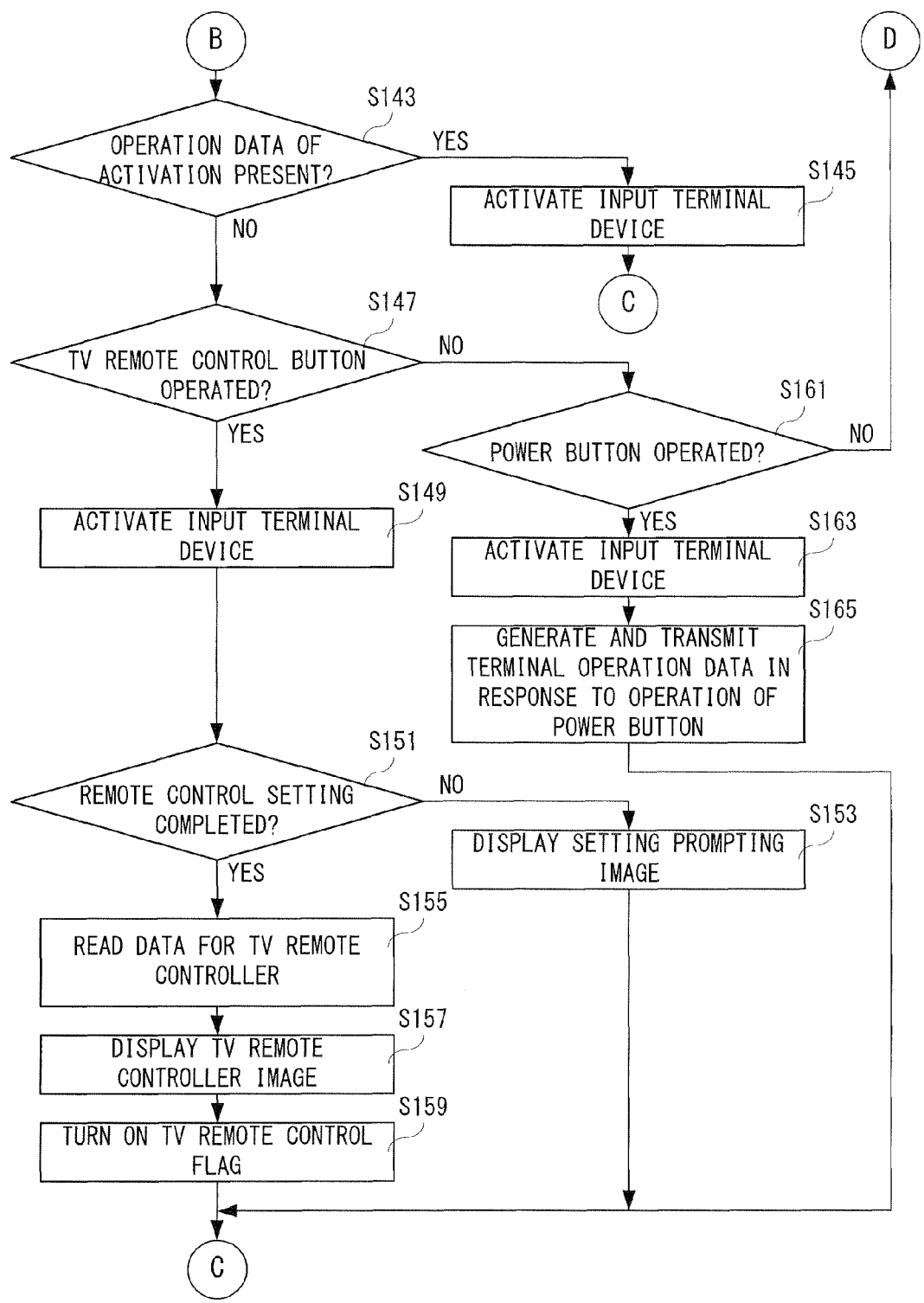
FIG. 16 shows an example non-limiting a sixth part of the flowchart showing the control processing by the CPU of the input terminal device shown in FIG. 4.

In addition, as described above, in a case that it is in the sleep state, "YES" is determined in the step S71, and it is determined whether or not the control data 514*a* of activation (power-on) is received in the step S143 shown in FIG. 16.

From now on, processing the same as the processing described in the steps S71-S141 is simply described.

If "YES" in the step S143, that is, if the operation data of activation (power-on) is received, the input terminal device 7 is activated in a step S145, and the process returns to the step S73 shown in FIG. 11. On the other hand, if "NO" in the step S143, that is, if the operation data of activation is not received, it is determined whether or not the TV remote control button 71 is operated in a step S147. If "YES" in the step S147, the input terminal device 7 is activated in a step S149.

In a next step S151, it is determined whether or not the remote controller setting is completed. If "NO" in the step S151, the setting prompting screen is displayed on the LCD 51 in a step S153, and the process returns to the step S73 shown in FIG. 11. On the other hand, if "YES" in the step S151, the data for TV remote controller is read in a step S155. Then, the TV remote controller image 300 is displayed on the LCD 51 in a step S157, the TV remote control flag 518 is turned on in a step S159, and the process returns to the step S73 shown in FIG. 11.

Alternatively, if "NO" in the step S147, it is determined whether or not the power button 72 is operated in a step S161. If "NO" in the step S161, the process returns to the step S71 shown in FIG. 11. On the other hand, if "YES" in the step S161, the input terminal device 7 is activated in a step S163, and terminal operation data in response to an operation of the power button 72 is generated and transmitted in a step S165, and the process returns to the step S73.

Although illustration is omitted, in a case that the input terminal device 7 receives the operation data of suspension from the game apparatus 3, if the television control mode is not set, it is changed into the sleep state. On the other hand, if the television control mode is set, the input terminal device 7 is continued in the television control mode without being changed to the sleep mode.

According to this embodiment, in a case that a predetermined input is present, the mode capable of making an input to the game apparatus and the mode capable of controlling the television are switched, and therefore, there is no need of changing from the input terminal device to a remote controller attached to the television.

Also, according to this embodiment, in a case that the input terminal device functions as a remote controller device of the television, the game apparatus need not suspend or stop the processing of the application, and therefore, it is possible to operate the television with the processing of the application continued.

In addition, according to this embodiment, the operation data of the game apparatus and the operation data of the television are different in communication system, and thus, the game apparatus and the television are never operated by mistake.

Furthermore, in the embodiment described above, the description is made on a case that a control of a television as an appliance to be controlled that is different from the game apparatus is performed, but there is no need of being restricted thereto. For example, an appliance capable of being operated remotely, such as air conditioners, audio products, ceiling lights, etc. can be regarded as appliances to be controlled. Here, transmission format data in correspondence with each appliance need to be registered (stored) in the input terminal device.

Also, in this embodiment, the description is made on a case that operation data to the appliance to be controlled is transmitted by an infrared ray signal, but there is no need of being restricted thereto. The operation data may be transmitted in other formats, such as Wi-Fi, Bluetooth (registered trademark), etc. to the appliance to be controlled. Here, in a case that the operation data to the appliance to be controlled and the operation data to the game apparatus are transmitted by the same formats, band of frequencies to be used may be made different between them.

In addition, in the embodiment described above, the TV remote controller image is displayed, and according to a touch operation, the television is operated (controlled), but in place of this or together with this, by using the operation button 54, the television may be operated.

Furthermore, in the embodiment described above, the dedicated button such as the TV remote control button is provided to the input terminal device, and in a case that the button is turned on, the television control mode is set, but there is no need of being restricted thereto. Similar to a case that the dedicated button is turned on, in a case that a predetermined input is detected, the television control mode may be set.

For example, the input terminal device is provided with various sensors, such as a microphone, a camera, an acceleration sensor, a gyro sensor, or the like, and therefore, it is possible to determine whether or not a predetermined input is present by detecting a sound, recognizing an image, detecting brightness (luminance), detecting accelerations, and detecting an angular velocity. Then, in a case that a sound (voice) equal to or more than a predetermined volume is detected, in a case that a predetermined facial image is detected (recognized), in a case that light equal to or more than predetermined luminance is detected, in a case that an attitude, a movement or a swing of the input terminal device is detected from the change in accelerations and angular velocity, or in a case that an combined operation of other buttons except for the dedicated button is detected, it is possible to determine that a predetermined input is present.

Moreover, the above-described embodiment can be applied to a control system in which the control processing shown in FIG. 11-FIG. 16 is distributedly performed by a plurality of computers, etc.

In addition, in the embodiment described above, an input terminal device utilized together with the console type game apparatus is described as one example, but the configuration of the input terminal device described in this specification can be applied to arbitrary devices used to be held by a user. For example, the input terminal device may be embodied as information terminals, such as a hand-held game machine, a feature phone, a smartphone, and an e-book reader, etc.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer readable storage medium storing at least one program for execution by a computer of an input device that is configured to display images on a display screen intergrated with the input device, the program comprising instructions that cause the computer to:
   detect input(s) provided to the input device;
   in at least an application mode output to the display screen, image(s) generated in accordance with an execution of an application that uses at least some of the input(s) detected by the input device;
   while in the application mode determine whether or not a predetermined input is present from the detected input(s);
   in response to determination that the predetermined input is present, switch from (1) the application mode in which the image(s) generated from the executing application are being output to (2) an appliance control mode where the computer overlays an appliance control image on the images(s) being output to the display screen; and
   in the appliance control mode, receive input and control an appliance, which is separate from the input device, in accordance with the received input while the image(s) are being output to the display screen and overlaid with the appliance control image.

2. The non-transitory computer readable storage medium according to claim 1, wherein the instructions further cause the computer to:
   while in the appliance control mode determines whether of not the predetermined input is present from the detected input(s); and
   in response to determination that the predetermined input is present while in the appliance control mode, switch from the appliance control mode to the appliance mode.

3. The non-transitory computer readable storage medium according to claim 1, wherein the instructions further cause the computer to:
   in the application mode, cause a speaker to output sounds that are based on an audio data provided in accordance with execution of the application; and
   cause the sounds based on the audio data and output by the speaker to be output at lower in response to switching to the appliance control mode.

4. The non-transitory computer readable storage medium according to claim 1, wherein said application includes a game application.

5. The non-transitory computer readable storage medium of claim 1, wherein the input device includes a housing with which the display screen is integrated into, the housing including an infrared emitter configured to emit infrared signals to an infrared receiver associated with the appliance, the instructions further configured to:
   control the infrared emitter to emit infrared signal(s) that are determined based on the received input, the emitted infrared signal(s) configured to control the appliance in accordance with reception by the infrared receiver thereof.

6. The non-transitory computer readable storage medium of claim 1, wherein:
   the appliance is an electronic device, which is separate from the input device, that outputs a video signal to a remote display screen for display thereon,
   the appliance control mode is a remote display control mode for controlling the electronic device, and
   the appliance is controlled via wirelessly transmitted control commands that are transmitted from the input device to the electronic device to cause a change in functionality of the electronic device.

7. An control system that is configured to switch between an application mode and an appliance control mode, the control system comprising:
   a display device that includes a display screen that is intergrated into a housing;
   and input device disposed on/in the housing and configured to detect input provided or caused by a used her the input device;
   and infrared emitter configured to emit infrared signals to an infrared receiver of an appliance that is separate from the input device; and
   A processing system that includes at least one processor coupled to a memory device, the processing system configured to:
      in at least the application mode, output, to the display screen, image(s) that are generated based on execution of an application program that uses input(s) received via the input device;
      while in the application mode, determine whether or not a predetermined input is present;
      in response to determination that the predetermined input is present, switch from (1) the application mode in which the image(s) based on execution of the application are being output to (2) the appliance control mode capable of controlling the appliance; and
      in the appliance control mode, receive input and cause the infrared emitter to emit an infrared signal in accordance with the received input, the emitted infrared signal configured to control the appliance in accordance with reception by the infrared receiver.

8. The control system of claim 7, wherein the processing system is further configured to, in the appliance control mode, overlay an appliance control image on top of the images that are output based on execution of the application program, where the input is received while the appliance control image is overlaid.

9. The control system of claim 7, wherein the application program continues to execute while the appliance control image is output to the display screen and images are continually output to the display screen based on the continued execution of the application program while the appliance control image is overlaid.

10. A computer system comprising:
   a display screen that is intergrated into a housing that can be moved through the air by a user holding the housing;
   a user input control disposed on/in the housing and configured to detect provided input(s); and
   at least one processor disposed in the housing and coupled to the display screen and the user input control, the at least one processor configured to:
      in at least an application mode, output, to the display screen, image(s) generated in accordance with the execution of an application that uses at least some of the input(s) detected by the user input control;

while in the application mode, determine whether or not a predetermined input has been detected by the user input control;
in response to determination that the predetermined input is present, switch from (1) the application mode, in which the image(s) generated from the executing application are being output to the display screen, to (2) an appliance control mode; and
in the appliance control mode:
overlay an appliance control image on the image(s) being output to the display screen generated due to execution of the application program, and
receive input and control an appliance which is separate from the input device, in accordance with the received input while the image(s) are being output to the display screen and overlaid with the appliance control image.

11. The computer system of claim 10, further comprising:
a wireless transceiver disposed in/with the housing and coupled to the at least one processor; and
an information processing apparatus that includes another wireless transceiver configured to communicate with the wireless transceiver of the housing,
the at least on processor further configured to:
cause the wireless transceiver disposed in/with the housing to transmit application operation data that is based on the at least some of the input(s) detected by the input device;
generate appliance operation data corresponding to the received input,
wherein the appliance is controlled in accordance with the wireless transmission of the generated appliance operation data to the appliance.

12. The computer system of claim 11, wherein the at least one processor is further configured to:
generate predetermined dummy operation data in response to switch to the appliance control mode; and
transmit the dummy operation data to said information processing apparatus.

13. The computer system of claim 11, wherein the application operation data and the appliance operation data are in different formats.

14. The computer system of claim 11, wherein the wireless transmission of the generated appliance operation data is transmitted by using a second transmitter that is different from the wireless transceiver used to transmit the application operation data.

15. The computer system of claim 11, wherein the at least on processor is further configured to:
select a kind of appliance that is to be controlled,
wherein the appliance operation data is generated depending on the selected kind of appliance.

16. The computer system of claim 11, wherein the at least one processor is further configured to:
receive, via the wireless transceiver, image data transmitted from the information processing apparatus that was generated based on execution of the application by the information processing apparatus,
wherein the output image(s) are based on the received image data.

17. The computer system of claim 11, wherein the at least one processor is further configured to:
accept power-supply control information provided via a or the used input control;
generate power control data based on power-supply control information irrespective of whether the application control or the appliance control mode is activated; and
cause the generated power control data to be transmitted, via the wireless transceiver, to the information processing apparatus.

18. A method of controlling an input device that includes at least one processor coupled to a display screen that is integrated into the input device, the method comprising:
detecting input(s) provided to the input device;
in at least an application mode outputting, to the display screen, image(s) generated in accordance with execution of an application program that used at least some of the input(s) detected by the input device;
while in the application mode, determining whether or not a predetermined input is among the detected input(s); and
in response to determination that the predetermined input is among the detected input(s), switch from (1) the application mode, in which the image(s) generated from the executing application program are being output to the display screen to (2) an appliance control mode,
when in the appliance control mode:
overlaying an appliance control image on the image(s) being output to the display screen that was generated due to execution of the application program, and
receiving input and controlling an appliance, which is separate from the input device, in accordance with the received input while the image(s) are being output to the display screen and the overlaid with the appliance control image.

19. A control system configured to switch between an application mode and a remote display control mode, the control system comprising:
an input device that is included in a housing, which is freely movable through the air by a user, the input device configured to detect input provided or caused by a user of the input device;
a display device that includes a display screen that is integrated into the housing; and
a processing system that is disposed in the housing and includes at least one processor coupled to a memory device, the processing system configured to:
in at least the application mode, output, to the display screen, image(s) that are generated based on execution of a computer application program that uses input(s) received via the input device;
while in the application mode, determine whether or not a certain input is received via the input device;
in response to determination that the certain input has been received, switch from (1) the application mode in which the image(s) based on execution of the application are being output to (2) the remote display control mode that is configured to control an electronic device, which is separate from the input device, that outputs a video signal to a remote display screen for display thereon; and
in the remote display control mode:
output a remote display control image to the display screen for display thereon, and
receive, via the input device, input and cause a wireless command to be communicated to the electronic device to cause a change in functionality of the electronic device.

20. The control system of claim 19, wherein the remote display control image is output to the display screen and overlaid on top of the images that are output to the display screen that are generated based on execution the computer application program.

21. The control system of claim 19, wherein the computer application program continues to execute while the remote display control image is output to the display screen.

22. An input device, comprising:
a display screen;
an input control disposed on/in a housing that the display screen is integrated into and configured to detect input(s) provided to the input device; and
at least one processor disposed in the housing and coupled to the display screen and the user input control, the at least one processor configured to:
   in at least an application mode, output, to the display screen, image(s) generated in accordance with execution of an application that uses at least some of the input(s) detected by the user input control;
   while in the application mode, determine whether or not a particular input has been detected by the user input control;
   in response to determination that the particular input has been detected, switch from (1) the application mode in which the image(s) generated from the executing application are being output to (2) an appliance control mode; and
   in the appliance control mode:
     overlay an appliance control image on the images(s) being output to the display screen generated due to execution of the application program, and
     receive input and issue control commands to control an appliance, which is separate from the input device, in accordance with the received input while the images(s) are being output to the display screen and overlaid with the appliance control image.

23. The input device of claim 22, further comprising:
an infrared emitter configured to emit infrared signals to an infrared receiver associated with the appliance,
wherein the at least one processor is further configured to control the infrared emitter to emit infrared signal(s) that are based on the issued control commands, the emitted infrared signal(s) configured to control the appliance in accordance with reception by the infrared receiver.

24. The input device of claim 22, wherein the appliance control mode is a remote display control mode for controlling an electronic device, which is separate from the input device, that outputs a video signal to a remote display screen for display thereon,
wherein the issued control commands are wireless commands communicated to the electronic device to cause a change in functionality of the electronic device.

* * * * *